United States Patent [19]
Morin et al.

[11] Patent Number: 5,748,841
[45] Date of Patent: May 5, 1998

[54] SUPERVISED CONTEXTUAL LANGUAGE ACQUISITION SYSTEM

[76] Inventors: Philippe Morin, 3449 Richland Dr., Apt. 8, Santa Barbara, Calif. 93105; Jean-claude Junqua, 146 Santa Ana Ave., Santa Barbara, Calif. 93111

[21] Appl. No.: 833,912

[22] Filed: Apr. 10, 1997

Related U.S. Application Data

[63] Continuation of Ser. No. 201,893, Feb. 25, 1994, abandoned.

[51] Int. Cl.$^6$ .......................................................... G10L 3/00
[52] U.S. Cl. .......................................... 395/2.66; 395/2.86
[58] Field of Search ................................... 395/2.66, 2.86, 395/751, 759, 2.64

[56] References Cited

U.S. PATENT DOCUMENTS 4,688,195  8/1987  Thompson et al. ...................... 395/12
4,931,935  6/1990  Ohira et al. ............................... 364/419
5,278,980  1/1994  Pederson et al. ......................... 395/600
5,386,556  1/1995  Heidin et al. ............................ 395/600
5,418,717  5/1995  Su et al. ................................. 364/419.08
5,442,780  8/1995  Takanashi et al. ....................... 395/600
5,477,451 12/1995  Brown et al. .......................... 364/419.08

*Primary Examiner*—David D. Knepper
*Assistant Examiner*—Richemond Dorvil
*Attorney, Agent, or Firm*—Harness, Dickey & Pierce, P.L.C.

[57] ABSTRACT

The language acquisition system assists the user in acquiring the language of an application. The system uses the dialogue context, a dialogue model and syntactic-semantic grammars to progressively build commands which, to the application program, are syntactically and semantically correct in the current context and which can be interpreted by the dialogue server which then controls the application program. The system is independent of any particular application language. The system is also multimodal and supports both speech and text input. A toolkit is provided to add this functionality to virtually any application program.

37 Claims, 11 Drawing Sheets

Description of the Current Dialogue Model

*For illustration let's consider the case of a Phone System application:*

The Five Top-Level Dialogue Structures and Some Examples

1 - Direct Answer to the Current Question
    Sys: What else ?
    Usr: Erase new messages
    Sys: Are you sure ?
    Usr: Yes

2 - Over-Informative Answer
    Sys: What else ?
    Usr: Call
    Sys: Who should I call ?
    Usr: Call David

3 - Ellipsis on the Last Command
    Sys: What else ?
    Usr: Play first message
    Sys: Playing message 1
    Usr: Second message

4 - Corrective Expression
    Sys: What else ?
    Usr: Call David
    Usr: No Brian

5 - Dialogue Meta-Command
    Sys: What else ?
    Usr: Erase new messages
    Sys: Are you sure ?
    Usr: Repeat

| Rule # | Grammar Entries | | |
|---|---|---|---|
| | Define <Color> as<br>} | | |
| #0 | -> red | 160 | @:="Color=Red()" ; |
| #1 | -> black | | @:="Color=Black()" ; |
| #2 | -> green | | @:="Color=Green()" ; |
| #3 | -> dark green | | @:="Color=Green(Intensity=Low())" ; |
| 150 | | | 162 |
| | Default @:="Color=?()" ;<br>} | | |
| | Define <Name> as<br>{ | | |
| #4 | -> alpha | | @:="Name=Alpha()" ; |
| #5 | -> beta | | @:="Name=Beta()" ; |
| 152 | Default @:="Name=?()" ;<br>} | | |
| | Define <Item> as<br>{ | | |
| #6 | -> cube | | @:="Cube" ; |
| #7 | -> sphere | | @:="Sphere" ; |
| 154 | Default @:="?" ;<br>} | | |
| | Define <NounPhrase> as<br>{ | | |
| #8 | -> the <Item> | | @:="Item=$(Attributes{})"(@1); |
| #9 | -> the <Color> <Item> | | @:="Item=$(Attributes{$})"(@2,@1); |
| #10 | -> the <Item> <Name> | | @:="Item=$(Attributes{$})"(@1,@2); |
| #11 | -> the <Color> <Item> <Name> | | @:="Item=$(Attributes{$,$})"(@2,@1,@3) |
| 156 | Default @:="Item=?()" ;<br>} | | |
| | Define <TopLevel> as<br>{ | | |
| #12 | -> <NounPhrase> | | @:=@1 ; |
| #13 | -> Reduce <NounPhrase> | | @:="Pred{Command=Reduce(Case1{Obj{$}})}"(@1) ; |
| #14 | -> <Color> | | @:=@1 ; |
| 158 | Default @:="?" ;<br>} | | |

Incremental construction of a tree

Given a mask, the procedure will create a sub-tree whose arcs represent the constraints that must take place to generate the associated syntactic form(s) in relation with the grammar. When no arc is attached to a node, then the whole corresponding grammar rule can be used for expansion.

1 - SetConstraintSemanticCompletion( &Tree, "Item=$(Attributes{Color=$0})", &SysGrm,&TskGrm)
2 - SetConstraintSemanticCompletion( &Tree, "Color=$($)", &SysGrm,&TskGrm)

*(Dollar sign ($) indicates that any string substitution is allowed)*

Before #1

Tree ⟶ ∅

After #1

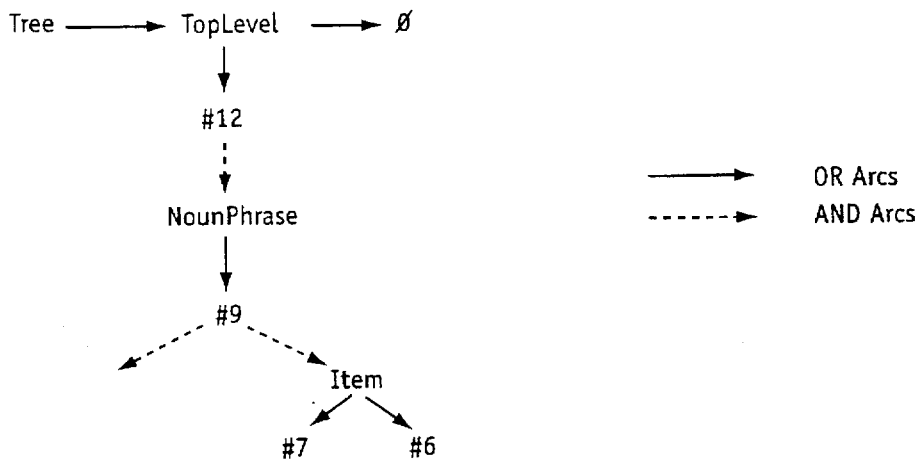

⟶ OR Arcs
----▶ AND Arcs

After #2

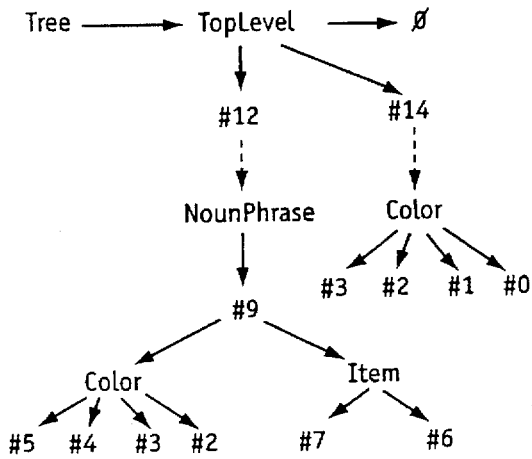

Figure 10

Building semantic masks from the dialogue context

Flags N: Form can be denied [ form #4 ]
P: Form can be used as it is [ forms #2 (and #1 in case of the immediate Read)]
E: Form can be used as an ellipsis [ form #3 ]

SUPERVISED CONTEXTUAL LANGUAGE ACQUISITION SYSTEM

This is a continuation of U.S. patent application Ser. No. 08/201,893, filed Feb. 25, 1994 entitled "Supervised Contextual Language Acquisition System" now abandoned.

BACKGROUND AND SUMMARY OF THE INVENTION

The present invention relates generally to natural language modeling, speech and dialogue recognition by computer. More specifically, the invention relates to a multimodal dialogue environment and user interface to assist a user in acquiring the language of an application or computer program using text and speech input. The system allows users unfamiliar with the language or available commands of an application or computer program to progressively build sentences which will have meaning to the application or computer program.

The introduction of text and speech input and output channels in applications and computer programs responds to a growing need for user-friendly interfaces. There is, nevertheless, still a long way to go. A more natural interaction between human and machine is necessary before complex computing machines, application software and computer programs will be truly useful to the masses.

By way of example, consider the interface between the average human user and a full-featured database management application. Although the human user may be quite intelligent, he or she may not be fully acquainted with the capabilities and features of the application program and may not have the time or desire to consult the necessary series of help screens and users' manuals to find out. As a result, many of the functions and features of the application are unused.

In one respect, the problem may be that even complex computer applications and computer programs do not provide the flexible input/output bandwidth that humans enjoy when interacting with other humans. Until that day arrives, the human user is relegated to the position of having to learn or acquire a precise knowledge of the language that the computer application can understand and a similar knowledge of what the application will and will not do in response. More precisely, the human user must acquire a knowledge of-enough nuances of the application language to allow the user to communicate with the application in syntactically and semantically correct words or phrases.

Point and click graphical user interfaces were developed in part to simplify the human/machine interface. While icon and menu selection is helpful in simplifying some types of human/machine interaction, often the use of such systems entails a great deal of effort by the user, with continual shifting between keyboard and mouse. To some, today's graphical user interfaces are like playing charades with the computer when the user would rather simply speak.

Communication using natural language speech for input and output has the potential to greatly improve naturalness and ease of use. However, the mere use of voice-based systems does not guarantee the success of a user interface, since human users, accustomed to speaking with other humans, naturally expect a complete dialogue environment. The ability to recognize simple words or sentences is not enough. The complete dialogue environment needs to take into account a history of what has been said before and needs to provide the human user with the ability to correct, amplify and explain previous statements. The complete dialogue environment should also have the ability to handle speech recognition errors.

The work by others on improving the user interface has typically centered on individual aspects of the problem. For example, U.S. Pat. No. 5,103,498 to Lanier et al. entitled "Intelligent Help System," describes an intelligent help system which processes information specific to a user and a system state. The system incorporates a monitoring device to determine which events to store as data in an historical queue. These data, as well as non-historical data (e.g. system state) are stored in a knowledge base. An inference engine tests rules against the knowledge base data, thereby providing a help tag. A display engine links the help tag with an appropriate solution tag to provide help text for display.

U.S. Pat. No. 5,237,502 to White entitled "Method and Apparatus for Paraphrasing Information Contained in Logical Forms," discloses a computer-implemented system for creating natural language paraphrasing of information contained in a logical form.

U.S. Pat. No. 5,239,617 to Gardner et al. entitled "Method and Apparatus Providing an Intelligent Help Explanation Paradigm Paralleling Computer User Activity," describes an on-line, interactive intelligent help system which provides suggestions as to actions a user can take after entry into the system of an erroneous command or a question. The system responds with explanations of why the suggestions were made an how they work.

The system includes a natural language analyzer for converting the questions into goals. A knowledge base and an inference engine further analyze the goals and provide one or more suggestions on how to achieve such goals. An explanation generator uses such analysis to dynamically generate the explanations which are tailored to the user's goals.

U.S. Pat. No. 5,241,621 to Smart entitled "Management Issue Recognition and Resolution Knowledge Processor," describes a knowledge processing system with user interface for prompting the user to enter information and for receiving entered information from the user. The user interface is coupled to a knowledge model processor that includes a dialogue control interpreter that provides structured messages to a user to elicit responses from the user. The elicited information is stored in a user awareness database. The dialogue control interpreter operates according to predetermined dialoguing imperatives to elicit, record and access user responses in sequences that guide and motivate the user to follow predetermined sequences of thought, based on the recorded user awareness database.

U.S. Pat. No. 5,255,386 to Prager entitled "Method and Apparatus for Intelligent Help That Matches the Semantic Similarity of the Inferred Intent of Query or Command to a Best-Fit Predefined Command Intent," describes a data processing system which suggests a valid command to a user when the user enters a question or an erroneous command. The purposes of various commands executable by the system are stored as a plurality of intents. When the user enters a question or an erroneous command, the system looks up the intent corresponding to it and semantically compares such an intent with other intents. When another intent is found to be within a predetermined degree of similarity, based on the comparison, the command defined by such intent is offered as a suggestion to the user.

The above art does not provide a general mechanism for language acquisition in a multimodal framework. Furthermore, the methods described in the above art do not take into account characteristics inherent in the speech modality which allow the user to input words, sentence fragments or complete sentences. Finally, the above art does not implement a dialogue system does not provide a dialogue environment and does not provide a toolkit to develop dialogue-oriented applications.

The present invention provides a dialogue system and a complete dialogue environment to allow a human user to communicate with an application using natural language words, sentence fragments and complete sentences. The dialogue system keeps track of the dialogue being run by maintaining a dialogue history. The dialogue history contains the dialogue turns or exchanges already made and the context in which they occur. The system also makes use of the immediate context. The immediate context refers to what is logically expected from the user at this time. The immediate context is extracted from the application scripts representing the scenario. Therefore the system automatically takes into account what has been done and what can be done next. It makes it possible to prompt the user with possible sentences or fragments of sentences that can be understood at that point in the dialogue. The stored history is also available to allow the system to backtrack or revert to a previous point in the dialogue, allowing the user to readily correct or change previously communicated dialogue.

The dialogue system provides a dialogue model which defines the type of interaction that is supported. It is based on the notion of meta-language or meta-commands. Meta-commands are commands that the dialogue system handles internally. Such commands are thus different from simple commands that are intended to be meaningful to the target application or computer program. Since meta-commands are handled by the dialogue system, the specification of the application program is simplified and focused on the task. For example, the expression "paint the cube alpha in red" is considered a simple expression which might be intended for a target application such as a paint program. Conversely, the expression "no in blue" is a meta-command, since it operates on the dialogue structure itself. In this way, the word "no" is intended for and therefore interpreted as an instruction to the dialogue system to negate the previous statement and correct it. Other examples of meta-commands include: "Cancel," "Repeat" and "Help."

The dialogue system of the invention also includes a mechanism for storing natural language grammar for the target application (task grammar) and also for the dialogue system itself (system grammar).

The grammars are used by the dialogue system for the recognition of text and speech input and for generation as well. They are syntactic-semantic grammars that describe the sentences that are proper and syntactically correct along with their meaning. A single representation formalism independent of the I/O modes which is based on a case-frame representation is being used as semantic representation. Application scripts are programs made of elementary dialogue instructions that are interpreted by the dialogue system to parse and evaluate user inputs. They describe what are possible user commands that are valid and their logical sequencing. They describe also the processing that must be done in the target application when a user input has been parsed.

Given an input event form the user the dialogue system will first try to recognize it and convert it into a semantic expression. Then the expression will be tested against the dialogue model to determine if it is a meta-command or a simple command. If the inputted expression makes sense in the dialogue context it will be interpreted and eventually application scripts will be run. At each step of the interpretation the dialogue history will be updated until a point is reached where the dialogue system requires another user input.

Because the dialogue system has a knowledge of the ongoing dialogue—through the dialogue history and immediate context—it is possible for the system to predict what can be said next according to the dialogue model. To do so, two trees are constructed by the system. They represent syntactic constraints that are applied on the system grammar and the task grammar. The trees are built using the existing dialogue context, the built-in dialogue model and the system and task grammars. Preferably semantic constraints representing what can be understood are used to derive the trees. Then the trees will be used to generate the words, sequences of words or sentences that can be successfully inputted.

Preferably the two trees are built after each user input. The dialogue system provides methods for showing the computed sublanguage to the user interactively. This way the user can acquire an understanding of what the target application can do and an understanding of the language that can be used to communicate with the machine.

It is therefore an object of the invention to provide a language acquisition system and user guidance system to allow the user to interact with the target application even if he or she has little or no prior experience with the application. In this regard, it is another object of the invention to allow the user to progress in the building of a sentence or command, word by word or phrase by phrase, receiving assistance from the dialogue system as needed. It is a further object of the invention to automatically compensate for mistakes in the building of sentences or commands, such mistakes occurring, for example, through speech recognition errors. It is also an object of the invention to provide a dialogue system which can propose choices for the user in the building of sentences or commands, the choices being arranged in order of plausibility given the existing dialogue context. Still further, the invention allows the language acquisition mechanism, also called dialogue completion mechanism to be activated at the user's request.

More specifically, the invention in its preferred embodiment uses two constraint trees to represent the possible syntactic structures that can be generated from the dialog history and the immediate context. Given an initial string or partial sentence, the trees will be used to generate the list of possible next words—or completion list—to provide assistance to the user in learning the application language. The invention provides a protocol between the target application and a dialogue system. The protocol allows information to be exchanged between the user and the target application and to give the user guidance in acquiring an understanding of the target application language in context. The language acquisition system is multimodal; it provides a mechanism for both text and speech input, independently for any target application, using natural language described by a syntactic-semantic grammar. The dialogue system provides a mechanism which allows a user to progressively acquire knowledge of the language and to progressively build a sentence or command without actually executing the command. In this way, a user can browse through the features of a target application without actually operating the application. The mechanism also provides the user with an execution option to allow the sentence or command to be executed by the target application.

For a more complete understanding of the invention and its objects and advantages, reference may be had to the following specification and to the accompanying drawings.

BRIEF DESCRIPTION OF THE DRAWINGS

FIG. 5 is a description of the dialogue model, using a telephone system application as an example;

FIG. 9 illustrates an example of a task grammar of the type utilized by the presently preferred dialogue system;

FIG. 10 is a diagram illustrating how the constraint tree is built;

DESCRIPTION OF THE PREFERRED EMBODIMENT

Figure 1:
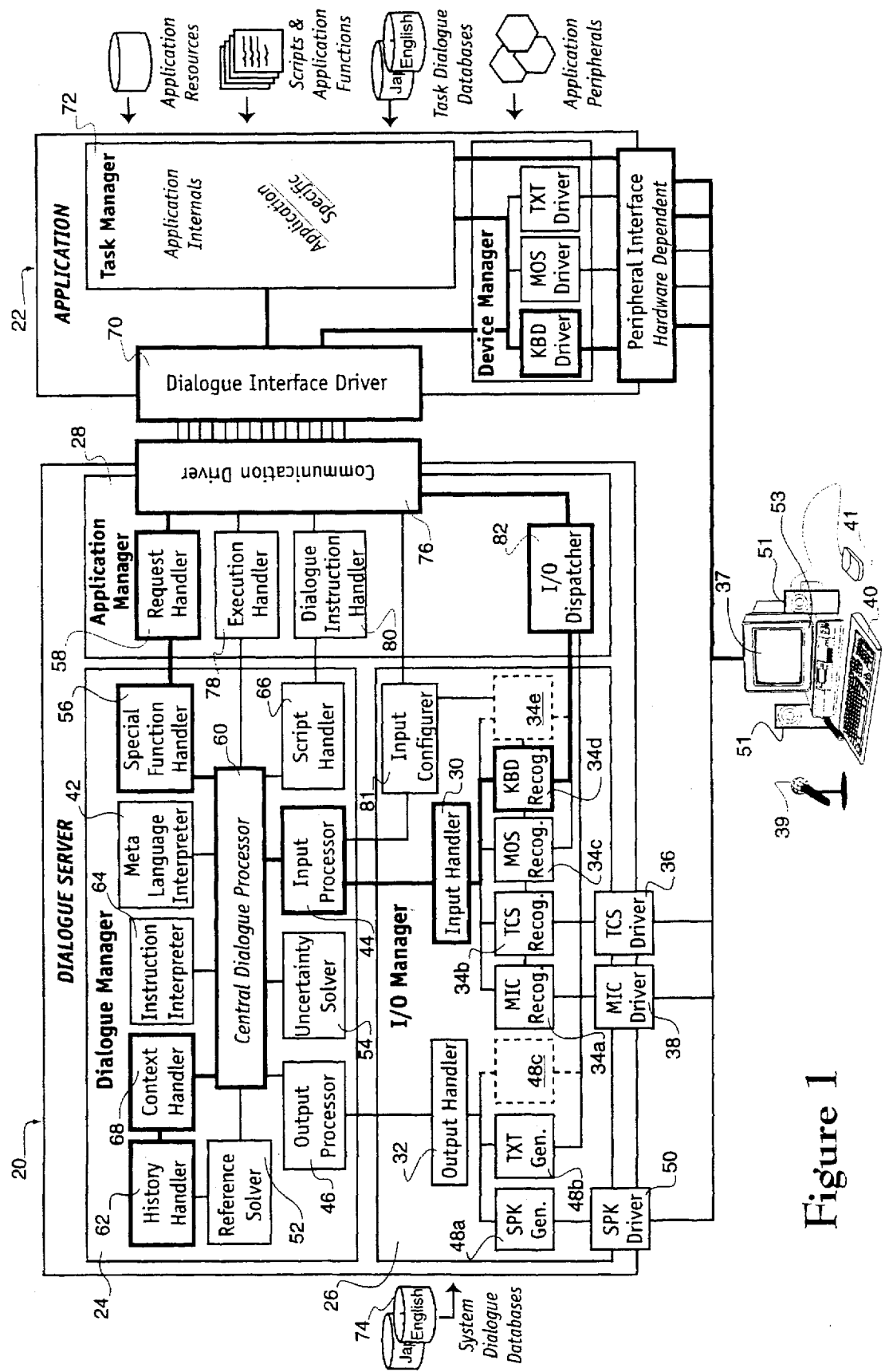
FIG. 1 is a block diagram illustrating the architecture of the presently preferred dialogue system, showing the modules used in text language acquisition highlighted in bold lines.
Figure 2:
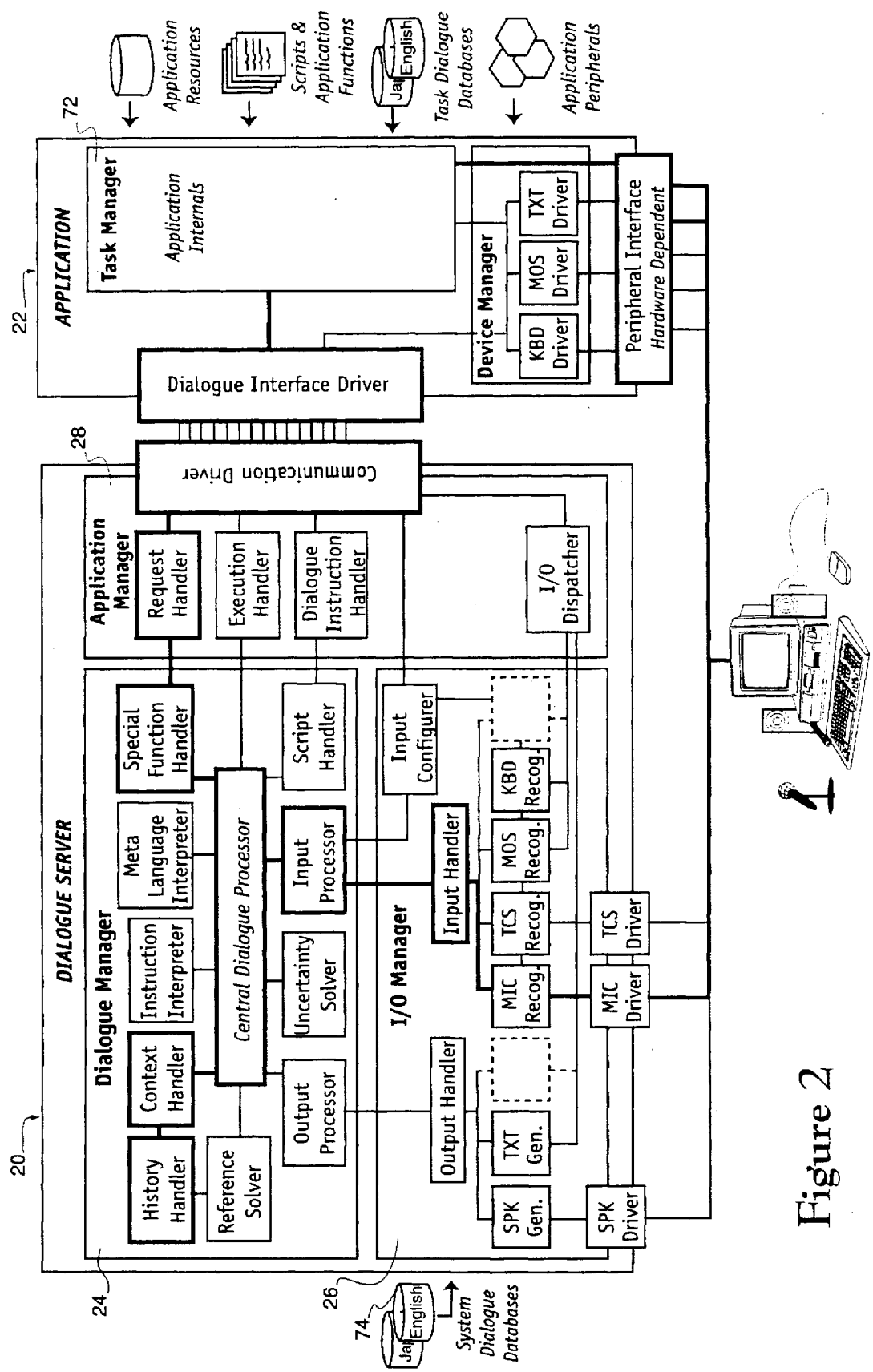
FIG. 2 is a similar block diagram, showing the modules used in speech language acquisition highlighted in bold lines.

An overview of the architecture of the presently preferred embodiment is illustrated in FIGS. 1 and 2. Both FIGS. 1 and 2 are essentially the same, except that FIG. 1 highlights in bold lines those modules involved in text language acquisition, whereas FIG. 2 highlights those modules involved in speech language acquisition. Therefore only FIG. 1 will be described in detail. However, it will be understood that the following description also applies to FIG. 2.

In FIG. 1 the dialogue system or dialogue server is depicted generally at 20 and the target application is depicted generally at 22. The dialogue system in turn comprises a dialogue manager 24, an input/output manager 26 and an application manager 28. The dialogue manager 24 serves as the intelligent interface between the input/output manager 26 and the application manager 28. The input/output manager 26 is responsible for handling multimodal communication with the human operator. The application manager 28 is responsible for handling communication with the target application 22. The input/output manager 26, the dialogue manager 24 and the application manager 28 work together to provide a multimodal interface between the human operator and the target application.

Input/Output Manager

More specifically, the input/output manager or I/O manager 26 is in charge of managing the input and output flow between the user and the dialogue manager 24. Specialized sub-modules are used to handle the different I/O modes.

In input, the I/O manager's role is to recognize and understand input events coming from the drivers (discussed below) and to communicate their possible meanings to the dialogue manager for interpretation. A single semantic representation formalism, independent of the input device being used, is defined based on a case-frame representation. For each mode supported by the server, a recognizer is provided. The recognizer decodes the signal coming from the attached driver and tries to parse and interpret it. The result is a list of possible meanings expressed in the semantic language.

As shown in FIG. 1, drivers can be either application dependent—in which case applications are required to handle the device—or application independent—in which case they are directly handled by the dialogue server. In the former case, the server provides functions to send input messages via the application manager 28. Application dependent drivers include the mouse driver and keyboard driver, since they are very hardware and software dependent (e.g. dependent on the type of keyboard, operating system and graphic library used to develop the application). On the other hand, application independent drivers include the microphone and touch screen drivers, since these drivers and their corresponding hardware are provided with the server.

In output, the I/O manager's role is to generate messages which are understandable by the user. It contains generators for each output mode, to derive signals from semantic expressions representing the information to be communicated. Here again, a driver (application dependent or application independent) is attached to each generator. One application dependent driver is the text driver, used for text output. One application independent driver is the speaker driver, used for speech output.

To each generator or recognizer is attached a device database that contains the necessary knowledge and/or expertise to operate the coding/decoding phase. Depending on the device, it can be either a static database—text and speech input and output—or a dynamically maintained database—touch screen and mouse input. Device databases are initialized at start-up and are configured through the input configurer 81 that channels configuration requests from the application or from the dialogue manager.

The presently preferred embodiment is multimodal, in the sense that it allows multiple modes of human interaction. The preferred embodiment supports keyboard input, mouse input, touch screen, speech input and also provides both text and speech output. While these modes of communication are presently preferred for most computer applications, the invention is not limited to these forms of communication. If desired, the capability of handling other modes of communication, such as three-dimensional position sensing as data input and such as tactile feedback as data output can be included. Support for multiple modes of input and output is provided by the input/output manager 26, which includes an input handler 30 and an output handler 32.

The input handler 30 formats and labels the output of each recognizer, so that the same formalism is used whatever input device is used. It delivers a list of possible interpretations, or semantic expressions, representing the input event to the dialogue manager 24 for processing. The input handler 30 is in turn coupled to a plurality of recognizers 34a–34e (collectively referred to herein as recognizers 34) and drivers. Given an input event a recognition/understanding phase will be started with the objective to derive the best semantic expressions that represent the event.

In a typical embodiment, there may be one recognizer for each mode of input. To the recognizers are coupled the appropriate device drivers if needed. In FIG. 1 a touch screen (TCS) driver 36 couples the touch screen 37 to recognizer 34b. Mike driver (MIC) 38 couples the microphone 39 to its associated recognizer 34a. In FIG. 1 keyboard 40 and mouse 41 communicate directly with keyboard recognizer (KBD) 34d and mouse recognizer (MOS) 34c without the need for additional device drivers, as these would normally be provided by the device manager of the application. In FIG. 1 an additional "generic" recognizer 34e has been illustrated to show how additional input channels/input modes may be added.

The input handling architecture of the preferred embodiment may be viewed as a plurality of data conversion layers which take device specific information (e.g. from a keyboard, microphone, mouse) and convert that information into a semantic representation suitable for manipulation by the dialogue manager 24. The dialogue system uses a single representation formalism which is independent of the input or output devices. In this regard, the device drivers, such as touch screen driver 36 and mike driver 38 are programmed to convert the electrical signals produced by human interaction with the input devices, into a data stream which the recognizers 34 can act upon.

The presently preferred I/O manager 26 handles four input devices: microphone (MIC) for speech input, keyboard (KBD) for text input, mouse (MOS) for mouse input and touch screen (TCS) for touch screen input. In the case of speech and text input, the dialogue databases 74 are used for recognition and understanding. Note that the microphone and touch screen drivers are built into the dialogue server 20. On the other hand, the mouse and keyboard drivers are located on the application side, since the way events are acquired depends on the graphic software used (e.g. Windows, X-Windows, Apple System 7).

In the case of the speech input recognizer 34a, the data stream from mike driver 38 might be a digitized representation of the input speech waveform, which the speech recognizer would process to identify phonemes and ultimately words. In the case of the keyboard recognizer 34d, the data stream from keyboard 40 may be in form of a sequence of ASCII characters or keyboard scan codes, which the recognizer would group into words. Finally, the mouse recognizer 34c might receive X-Y positional information and key click event data as a serial data stream which the mouse recognizer 34c would buffer through to the input handler 30. In this regard, each of the recognizers supplies its output to the input handler 30. If desired, the individual recognizers can attach a header or other identifying label so that the input handler 30 and the other modules further on in the data stream will have knowledge of which mode was used to input a given stream of data. The input handler 30 provides its output to the input processor 44 of the dialogue manager 24. The input processor 44 may be programmed to handle data conflicts, such as those which might occur when two modes of input are used simultaneously.

To handle speech and text I/O operations a plurality of dialogue databases 74 may be used by the recognizers/generators. They describe the natural language expressions that can be used as well as their meaning. A dialogue database is composed of an alphabet, a lexicon and a grammar. A dialogue database can be provided for different languages (e.g. English, Japanese, French) as illustrated. The task database describes the possible expressions in the application domain. The system database describes the possible expressions in the dialogue domain. Note that the system database contains pointers to the task database to build correction requests for instance.

More specifically, the dialogue databases 74 contain syntactic and semantic information on the language that the dialogue server can understand and therefore process. These databases are used for text and speech input and output. Each database is composed of an alphabet, a lexicon and a grammar that describes the structures—sentences or fragments of sentences—that can be legally built along with their associated meaning. In the presently preferred embodiment there is a system dialogue database and a task dialogue database. The system dialogue database describes the structures that compose the meta-language and is application independent. The task dialogue database describes the structures that are specific to the application being developed. Therefore, for each new application a task dialogue database must be defined by the application programmer. These databases are used for recognition by the microphone and keyboard recognizers and for generation by the speaker and text generators. Dialogue databases are language dependent. Therefore, system and task dialogue databases must be provided for each language used (e.g. English, Japanese . . . ). Note that no other adaptation is needed since the dialogue server and application operate and communicate at a semantic level.

On the data output side, the input/output manager 26 employs a similar, layered architecture. In this case, semantic expressions from the output processor 46 of dialogue manager 24 are supplied to the output handler 32 for generation. The output handler 32 is mainly a dispatcher that activates the necessary generators to generate messages to the user. The input data to the generators is a semantic expression. These expressions are converted to an output event directly manageable by an output driver. Preferably, the data delivered to output handler 32 includes a header or other identifying label which the output handler 32 uses to determine which output device or devices should be used to communicate with the human user. Output handler 32 supplies the data to the appropriate generators or converters 48a–48c (collectively referred to as converters 48), which in turn function to convert the data stream into an appropriate signal for delivery to a specific data output device. The presently preferred embodiment uses two output devices: speaker (SPK) for speech output and text (TXT) for text output. In both cases, the dialogue databases 74 are used for generation.

In the case of speech converter 48a, the data are converted using speech synthesis procedures to generate a data signal suitable for driving speakers 51 through its associated speaker driver 50. The presently preferred embodiment uses the StlTalk synthesizer of the applicants' assignee although any suitable speech synthesizer can be used. The speaker driver of the preferred embodiment is built into the dialogue server 20.

Similarly, text converter 48b assembles data in a form suitable for display on a monitor 53. This data are passed to the computer via I/O dispatcher 82 to the application program 22. The text driver is located in the application side (i.e. within application 22).

As before, an additional converter 48c has been illustrated to demonstrate how an additional output device might be coupled to the output handler 32 through an appropriate converter.

The dialogue manager 24 is the primary component responsible for the language acquisition capability of the present invention. At the heart of dialogue manager 24 is the central dialogue processor 60. This processor receives input from parser 44 and provides output to output processor 46. In addition, the central dialogue processor 60 also supplies output to the application manager 28. Central dialogue processor 60 uses the services of several additional software modules which have been illustrated in FIG. 1. These modules include a history handler 62, an instruction interpreter 64, a script handler 66, a context handler 68, a meta-language interpreter 42, special function handler 56, reference solver 52 and uncertainty solver 54.

Dialogue Manager

More specifically, the Dialogue Manager 24 is the heart of the server. It basically interprets the input events coming from the user via the I/O Manager that triggers actions inside the application via the Application Manager and eventually sends messages back to the user via the I/O Manager. All the processing that occurs here operates at a semantic level since all the syntactic information is transformed—coded or decoded—inside the I/O Manager. The Dialogue manager is composed of several specialized modules that allows the manager (1) to acquire a knowledge of the application being served via its dialogue specification—the scripts that it runs—, (2) to interpret input events in context by preserving a dialogue history and (3) to handle errors and uncertainties. Ultimately the strategies and the generic functions that have been implemented in the Central Dialogue Processor define a Dialogue Model. The model describes what the system can handle and how it will react to any dialogue situations. The notion of Meta-Language has been introduced to define the expressions that the Dialogue Manager can understand. This language is composed of (1) dialogue specific expressions— having meaning at the dialogue level (e.g. 'Repeat,' 'Cancel')—, (2) application specific expressions—having meaning at the application level (e.g. 'Play new messages') —and (3) mixed expressions (e.g. 'No message 2'). The dialogue manager can be placed in a mode whereby commands are built by the dialogue system but not actually sent to the application program. This capability allows a user to browse through or explore the target application's features, without actually operating the target application. This feature is performed by the special function handler 56, described below.

Central Dialogue Processor

The Central Dialogue Processor 60 coordinates the activity between the different modules inside the Dialogue Manager. Its role is to interpret user inputs in accordance with the application scripts while ensuring a reliable communication—error and uncertainty management in case of speech recognition errors for instance or ambiguities due to different possible interpretations of an input—and solving dialogue specific situations—e.g. processing of elliptical or anaphorical forms involving the dialogue context or processing of requests for repetition, correction and assistance—. That is the Central Dialogue Processor that will initiate questions to the user when information is needed by the application or it will use default values suppressing dialogue turns. One has to say that the dialogue—exchange of turns—is totally transparent to applications. Applications express interactional needs to the processor via the scripts but that is the processor that decides how the information is going to be obtained—through a direct question to the user, previously buffered data, default values or resolution strategies—. When the processor is idle waiting for user input, time-outs may be set so that actions will be taken if no input was provided within the specified delay.

Script Handler

The Script Handler 66 is responsible for providing the Central Dialogue Processor with the dialogue instructions the processor requests. Basically it serves as a dynamic instruction database defined to decrease the communication load between the server and the application. When an initial request is made on a given instruction, the handler will look for it in the database. If it is not found, a request to the Application Manager will be made for loading. At that point the application will be asked to transfer the specified instruction.

Context Handler

The Context Handler 68 is in charge of the dialogue context. The dialogue context represents the state of the ongoing dialogue. The context is composed of a short-term context and a long-term context. The short-term context holds information on the immediate focus of the dialogue— current question or current expectations—and also contains flags representing whether a proposal was made, the assistance and help modes are active or not etc. On the other hand the long-term context represents the story that has already been run. This task is supervised by the submodule History Handler. In a dialogue situation long-term information is essential to allow the interpretation of meta-language expressions such as request for correction and cancellation or to solve ellipses and references.

History Handler

The History Handler 62 is responsible for providing the Context Handler with long-term information on the dialogue. In Partner the history is a circular buffer containing the last dialogue instructions that have been executed as well as a set of input markers and eventually correction markers if corrective inputs have been made. Therefore the dialogue history does not contain only the User-Machine exchanges at the difference of other systems but integrates the execution context as well.

Instruction Interpreter

The role of the Instruction Interpreter 64 is to interpret the dialogue instructions given for processing by the central processor. The current system contains 15 dialogue instructions. The interpreter evaluates the instructions and maintains different class and sets of variables. It also contains functions to undo or redo sequences of instructions when asked by the central processor in case the user makes a request for explicit correction for instance. The dialogue instructions can be grouped into four categories: (1) Input/ Output instructions, (2) control instructions, (3) variable management instructions and (4) low-level application management instructions. Application scripts are composed of dialogue instructions and describe the application scenario in the proposed programming language. This set of instructions is generic and independent of the application.

Meta-Language Interpreter

The Meta-Language interpreter 42 is responsible for the detection and the primary handling of meta-commands received via the input processor. Meta-commands are user inputs which only make sense at the dialogue level in opposition to the application level. Such command include: 'Repeat,' 'Cancel,' 'No Message 2,' 'Speak Japanese,' etc. Depending on the command updates will be made on the appropriate dialogue entities. Meta-Commands involving manipulation at the script level—correction and cancellation requests—are then handled directly by the central processor.

Reference Solver

The role of the Reference Solver 52 is to assist the central processor when elliptical and anaphorical input are received from the user. For instance when the semantic input corresponding to the command 'No Paint It Red,' the pronominal referent It must be resolved to understand the command. The Reference Solver uses syntactic and class constraints contained in the semantic expression and the dialogue history to find the most plausible matching. Then it substitutes the real value of the reference. A similar scenario is made in the case of elliptical input.

Uncertainty Solver

The Uncertainty Solver 54 is the module that assists the central processor in choosing the correct hypothesis when several candidates for a given input event are generated by the I/O manager. When dealing with speech recognition and natural language processing, one has to take into account recognition errors that are introduced due to a lack of competence or performance of the speech recognizer, or also the inherent ambiguities introduced by the language itself. As a consequence to one input event—speech act, for instance—several possible meanings would be derived by the speech recognizer. Note that if speech recognizers were fully capable of recognizing speech, only one meaning would be generated in most cases. The Uncertainty Solver helps the central processor in doing implicit error recovery. The dialogue context is used to find out which one of the possible meanings makes the most sense at this point of the dialogue.

Special Function Handler

The Special Function Handler 56 is a module whose role is (1) to process application requests, (2) inform applications that certain conditions inside the dialogue server are met, and (3) to send secondary dialogue requests to the application. Note that primary dialogue requests—e.g. requests for execution and requests for dialogue instructions—are handled directly by the Central Processor and the Script Handler. They are requests for information or processing, while secondary dialogue requests are notification requests.

There is a wide variety of Special Functions handled by the module that we will not detail in this survey. Here are three examples:

1. When the dialogue server is processing a user input, a Busy status message will be sent to the application. As soon as it is idle waiting for user input, a Ready status will be sent.
2. When the application wants to enter the Text Acquisition Mode, a specific message will be sent that will activate the mode inside the server. In that case completion information will be sent back to the application later on.
3. When the meta-command 'Show the Manual' has been recognized by the Dialogue Manager, a request will be sent to the application to open the manual window.

Input Processor

The Input Processor 44 handles the input events sent by the I/O Manager. It has the possibility of buffering input events in case of quick successive inputs made by the user. To each input event is attached its source. Presently it can be either TouchScreen, Mouse, Keyboard or Microphone. When processing an input event, the central processor will ask the Input Processor for the possible meanings as well as their plausibility score. Finally when an input has been processed the input event will be cleared off. Functions are also provided to configure the input devices by giving hints on what makes sense at the dialogue level in order to obtain a more accurate and faster recognition. The current implementation allows to configure the Microphone recognizer only by means of a dynamic lexicon which indicates what words are possible given the current dialogue context. A new lexicon is computed after each dialogue turn. Finally note that the Input Processor functions under two modes for speech. In Normal mode inputs are interpreted as received by the Central Processor. In Fragment mode speech inputs are concatenated instead until an execute command is received. The Fragment mode corresponds to the Speech Language Acquisition feature that allows users to interactively build valid sentences word by word or fragment by fragment by voice until a meaningful sentence has been constructed. When this feature is enabled the Special Function Handler, using the dialogue context, will provide applications with a list of possible following words for display.

Output Processor

The Output Processor 46 is used to generate dialogue messages to the user. Note that each message is a semantic expression that will be sent to the I/O Manager for conversion and transmission. Messages can be played through different media at the same time. Commonly most spoken messages are also outputted as text messages to get a trace in a dialogue window for instance. Two output modes are currently supported: Text and Speech output. The output processor has also the possibility to cancel speech messages being played—talk over the feature—In a dialogue situation it is very common for users to answer or given commands quickly without waiting for the system to be ready and waiting. In such cases the speech output in progress is cancelled as well as any pending outputs.

Application Manager

The Application Manager 28 is an interface that serves as a communication link between the server's processing modules—Dialogue Manager and I/O Manager—and the application. Little processing is made here. The primary objective of the Application Manager is to synchronize the different requests (i.e. Dialogue and Application Requests) and to prevent mutual blockage. Note that Dialogue Server and Application are separate processes and that both of them can send requests at any time. The Manager is composed of a low level communication driver that handles the physical ports and four specialized preprocessors.

The application manager 28 is responsible for providing a proper interface to the target application 22. The actual interface is effected by a communication driver 76, which couples to or interfaces with the dialogue interface driver 70 residing in the target application. The application manager also includes an execution handler 78 which is responsible for sending the appropriate commands—specifically called application functions—to the application program that executes them. Application functions are triggered as a result of interpretation of user inputs. The execution handler, in effect, mimics in some ways the input to the application program which a user would normally enter in using the application program.

In some instances, a user may request a previous command or instruction to be withdrawn or corrected. The dialogue manager is able to recognize such a request as being intended initially as a command to the dialogue system. To the extent this command requires actions to be taken by the target application, the execution handler 78 handles this as well. Thus for example, if the user gives the instruction "paint the cube blue," and then immediately thereafter instructs the dialogue system with the command "cancel that," the central dialogue processor 60 will interpret the command and examining the stack of previously done actions contained in the dialogue history. It will then select the proper undo function and tell the application through the execution handler to execute it.

Communication Driver

The Communication Driver 76 supervises the communication and handles the communication protocol between the Dialogue Server and the applications. Several physical ports are open to handle the logical connection. It is composed of low level routines to detect the presence of data and to read and write data on the connection.

Dialogue Instruction Handler

The Dialogue Instruction Handler 80 is used by the Script Handler to load the dialogue instructions one by one. Its role is to access the requested instruction via the Communication Driver, to parse it and to format it into an internal representation directly usable by the Script Handler.

Execution Handler

The Execution Handler 78 is used by the Central Processor to trigger the execution of functions inside the application (e.g. Update Function) or get information that require processing (e.g. Help Function). Reference to the application functions is made in the scripts. Typically when the semantic expression corresponding to the command 'Play New Messages' has been parsed by the Central Processor, a specific processing—'PlayMessages(New)'—will be requested via the Execution Handler so that the application will play the new messages that have arrived.

Request Handler

The Request Handler 58 synchronizes the requests coming from the application or from the Dialogue Manager so that no conflict will occur. Eventually application requests will be buffered temporarily until the Dialogue Manager is in a coherent state to satisfy the request. Dialogue requests are propagated directly to the application.

I/O Dispatcher

The I/O Dispatcher 82 is in charge of communicating input or output information from or to the application dependent drivers. In input it will dispatch the input events to their appropriate recognizer—namely Mouse recognizer or Keyboard recognizer—. In output it will centralize the preprocessed events coming from the generators and will send them through the Dialogue-Application connection. Input events are buffered when their associated recognizer is busy.

The Target Application

Dialogue Server 20 and applications 22 are separate processes. The server provides a toolkit that defines the type of connection and the communication protocol. An Application Specification Model is provided to develop dialogue-oriented application using the toolkit. Application programmers must provide (1) Task Dialogue databases—one for each language (English, Japanese, etc.)—, (2) a set of scripts and application functions that represent the application scenario, (3) a dialogue interface driver that pilots the Dialogue-Application connection, and (4) a Port Manager to handle eventual application dependent drivers if needed. Besides these requirements they are free to structure the application as they wish and to use any software or hardware to implement it.

Dialogue Interface Driver

The Dialogue Interface Driver 70 should be typically composed of a main loop to catch dialogue requests and a variety of request functions. The type of requests available will not be discussed here.

Task Manager

The Task Manager 72 will contain the application internals. Note that the application functions referenced in the application scripts must be defined here since the dialogue manager will send requests for execution on these functions.

Port Manager

The Port Manager 74 should be in charge of controlling the application dependent dialogue devices. The current system invites application programmers to define a Mouse driver and a Keyboard driver in input and a Text driver in output. This is optional. If no keyboard is used by the application, the keyboard driver does not have to be defined.

Application Resources and Devices

Application Resources and Devices represent the data and devices that are specific to each application and are not dialogue related. In the case of a Compact Disk player application, resources might represent a set of compact disks and the device might be a compact disk player controlled by the application.

Scripts and Application Functions

The Scripts and Application Functions are the dialogue specification provided by the application that describe the scenario, valid operations available for this task and their sequences. The Toolkit defines a programming language to formalize the Human-Machine interaction. The programming language is application independent and is composed of elementary dialogue instructions. Dialogue instructions will be requested by the server and it will interpret them. The interpretation of user inputs when successful will activate the application functions referenced in the scripts.

Task Dialogue Databases

Task Dialogue Databases contain a definition of the natural language expressions for text and speech input/ output. These Databases are used for recognition and generation by the I/O Manager. A dialogue database is composed of an alphabet, a lexicon and a grammar that describes the possible sentences or fragment of sentences with their meanings. A Task Dialogue Database is application dependent since it describes the restricted natural language used for a given application. A Task Dialogue Database must be provided for each language (English, Japanese, etc.) the application will use.

The Language Acquisition System

The invention provides a language acquisition system which can assist the user in a dialogue with a computer-implemented application program. The language acquisition system employs a means for storing a dialogue context, a means for defining a dialogue model and a means for defining a syntactic-semantic grammar. The dialogue context is used to maintain a record of what commands have been previously entered. The dialogue model describes the structure of the dialogue itself. Thus, for example, a dialogue structure might include the ability to negate a prior command, or to provide a direct answer to a question, or to refer to a prior command or prior dialogue. Finally, the syntactic-semantic grammar defines the actual language which the application program can use. The use of a unique semantic representation formalism renders the language acquisition system independent of any particular application program language. This is an important advantage, since the language acquisition system of the invention can be supplied with data representing any desired application language. The data representing the application language is included in the syntactic-semantic grammar. Scripts describing dialogue scenarios are used to parse semantic expressions.

Another advantage of the unique semantic representation is that it readily supports multi-modal communication. The present system is able to handle both speech and text input. Other modes of communication can also readily be added. The dialogue context, dialogue model and the syntactic-semantic grammar work together to provide the user with commands which syntactically and semantically correct and which can be interpreted by the dialogue server in the current context.

The dialogue system 20 may be seen as an intelligent front end to the target application 22 for language acquisition. The dialogue system supplies the actual execution commands to the target application. Although the user has the experience of communicating directly with the target application, that communication is, in fact, monitored by and assisted by the dialogue system 20. In addition, the dialogue system continually dynamically builds tree-structured data representing what the application can do in each context. The data are available to the user, to assist the user in acquiring an understanding of the target application's capabilities and the target application's instruction set and language. In some instances, it may be desirable to allow the target application to configure the manner in which the input/output manager 26 functions. The input/output manager 26 is therefore provided with an input/output (I/O) configurer 81 which is coupled to the communication driver 76 and the input processor 44. It supplies configuration or setup requests to the recognizers as needed. In the case of the touch screen device, configuration requests concerns the definition of regions—size, position and semantic value—on the screen and their management. They will be used by the touch screen recognizer to interpret the X-Y coordinates received from the touch screen driver.

More specifically, the input configurer 81 allows the dialogue manager or the target application to configure the different recognizers according to different needs and/or requirements. In the case of the touch screen recognizer, for example, the input configurer 81 will receive the configuration request from the application that will create, move or delete virtual regions on the screen to which specific meanings are attached. In the case of the microphone recognizer, the input configurer will receive language constraints from the dialogue manager after each dialogue turn, in order to increase speed and accuracy of the recognizer. The constraints limit the search space to what makes sense in the current dialogue context.

To summarize, the dialogue system of the invention provides a contextual language acquisition mechanism which allows the user to build valid inputs interactively. The language acquisition mechanism corresponds to a mode in the dialogue system which can be turned on and off at the user's initiative. The system allows new users to operate an interface and to acquire the application language progressively. In this mode, speech and text inputs can be edited and entered, word by word, or character by character in the case of text input. At each step the dialogue system provides the next possible word choice or choices to complete the initial input.

Completion is contextual. Only valid inputs, that is inputs which make sense in the dialogue context, are generated. Valid inputs are inputs that are syntactically and semantically correct. They are predicted by the dialogue manager from the immediate context—application context—and the dialogue history according to the dialogue model (cf. metalanguage). The semantic constraints given by the dialogue manager are used to generate the syntactic structures from the application language. The text and speech completion modes can be turned on and off at any time.

Figure 3:
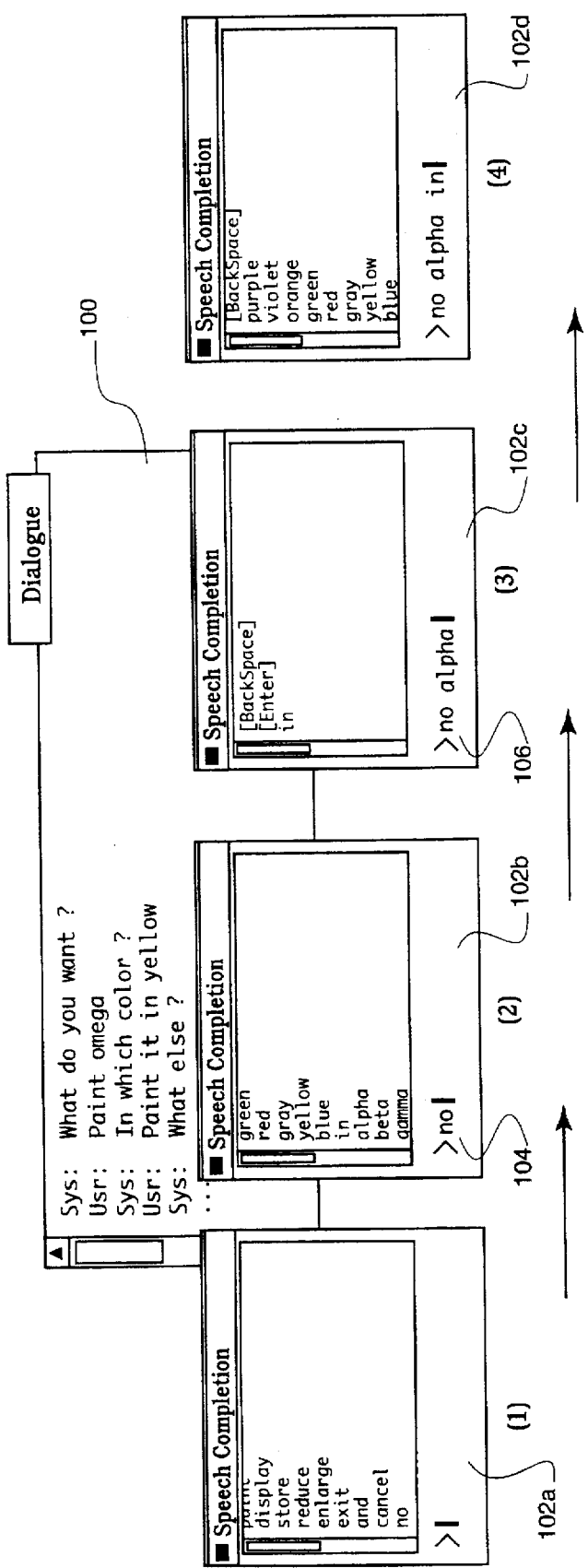
FIG. 3 is a series of computer screens showing a typical sequence of user/computer interaction, useful in understanding the language acquisition mechanism of the invention.

FIG. 3 shows a typical language acquisition sentence. In the example a dialogue window 100 displays the dialogue between the dialogue system (Sys) and the user (Usr). In addition, a series of speech completion windows 102a–102d have been illustrated to show how the dialogue system might provide information to the user about what the target application can do in the current context. When the user activates the language acquisition mode (if, for example, the user does not know what to do for the next command), the dialogue system will present a list of words or "completion list" which corresponds to the beginning words of all valid inputs that are syntactically and semantically correct. This is illustrated in the speech completion window 102a. For purposes of this example, assume that the user selects the word "no" from the list of 102a. This selection may be by selecting it with a mouse or touch screen or by saying the word "no" into the microphone. The word "no" now appears on the command line at the bottom of the screen as at 104 in FIG. 102b.

Having entered the first word ("no") the dialogue system displays a second list of words, showing all possible choices of words which can follow the word "no." This is illustrated in the speech completion window 102b. For purposes of this example, assume that the user selects the word "alpha" from the list of 102b. The dialogue system then automatically displays the list shown in speech completion window 102c. Note that the word "alpha" now appears on the command line following the word "no" (reference numeral 106). Note that one of the possible choices from the list of window 102c is [Enter]. In this case, the sentence "no alpha" makes sense at the syntactic and semantic level. Thus the user can execute the sentence as a command by entering the "[Enter]" command. For purposes of this example it will be assumed that the user selects the word "in" from the list of screen 102c. The dialogue system thus presents the window 102d. The process thus continues as described above until a complete, syntactically and semantically correct command has been built and entered. The dialogue window 100 shows a history of previous commands which have been entered. Thus, if the user ultimately enters the command "no alpha in blue," the command will appear as the last entry in dialogue window 100, below the entry "Sys: what else?".

The central dialogue processor builds intermediate constraint tree structures which are used to provide language assistance to the user. FIG. 1 highlights in bold lines the modules in the architecture involved in the Text Language Acquisition mechanism. FIG. 2 highlights in bold lines the modules in the architecture involved in the Speech Language Acquisition mechanism. Note that the main difference between the two modes comes from the fact that the MIC driver is built-in while the Keyboard driver is application dependent. Note also that in the current implementation Text and Speech modes function separately. Eventually both modes could be activated at the same time. In that case two completion windows would appear on the application display. To operate in text mode the keyboard and also the mouse for instance—by clicking on the entry and not typing it—can be used. To operate in speech mode the microphone or the touch screen for instance—by pointing on the entry and not speaking it—can be used.

The Dialogue System Toolkit

The presently preferred embodiment provides a toolkit which the application programmer can use to incorporate the language acquisition functionality of the present invention into an application program. A complete description of each module of the presently preferred language acquisition toolkit is set forth in the Appendix attached at the end of this specification. The following description makes reference to these toolkit modules, which are all identified by a name beginning with the letter Dt. . . . The interested reader may wish to look up the designated toolkit modules in the Appendix when reading the following description.

OPERATIONS PERFORMED WHILE IN TEXT MODE

Specification of the Text Mode

Figure 4:
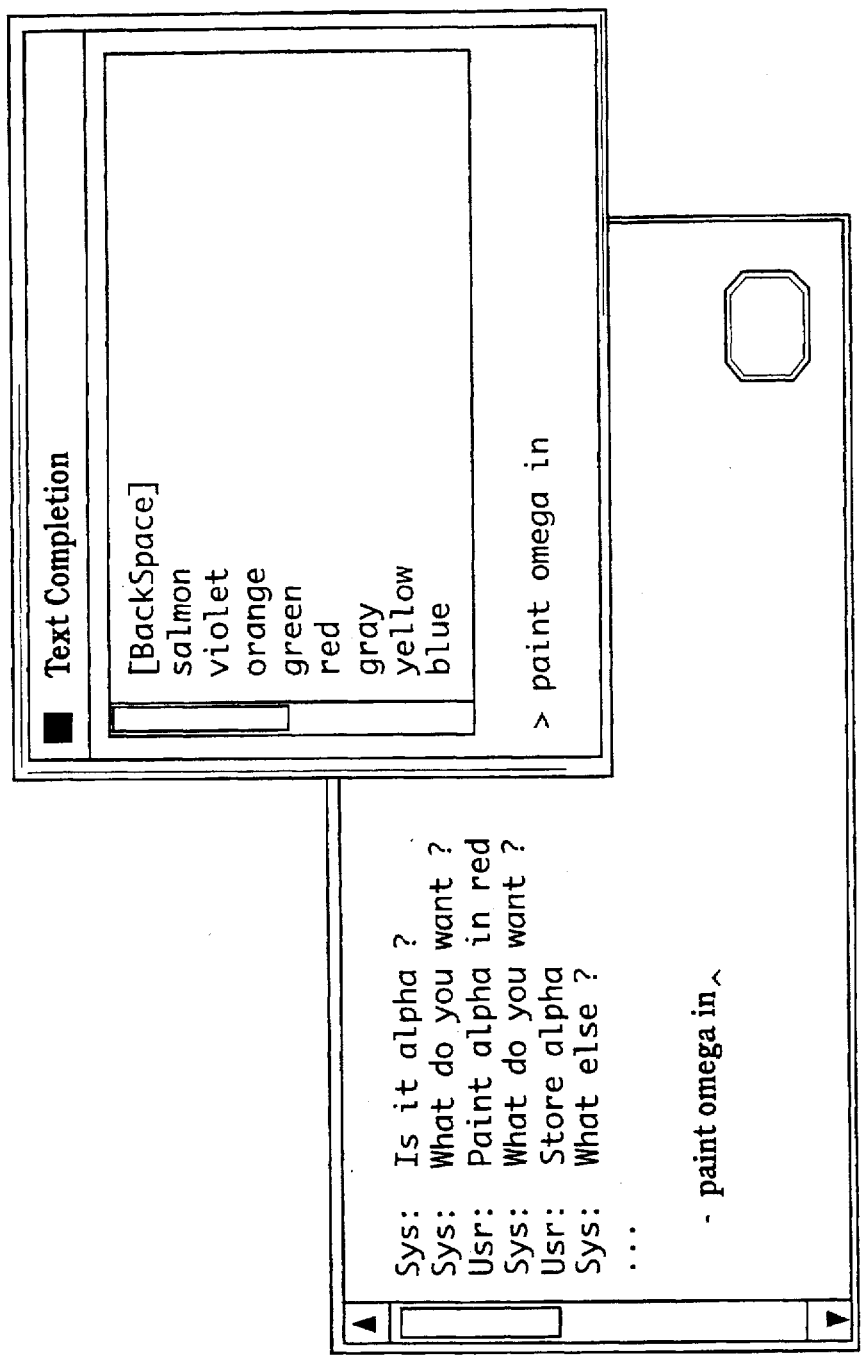
FIG. 4 is an exemplary screen showing text completion by the invention.

The Text Language Acquisition mode allows users to get assistance on the next possible word or words when they type on the keyboard interactively. It is then possible to build legal commands word by word. Legal commands are commands that are syntactically correct and semantically interpretable in the current context. The mechanism can be used to learn the application language or to check if the input buffer is correct or not. Typically users are shown a window that contains the next possible words—or possible ends of words if he or she is in the middle of a word. The entries are listed in order of plausibility. The process continues until a valid command is complete. At that point the command can be executed and the process restarts until the mode is deactivated. FIG. 4 shows a typical example. Because the keyboard is an application dependent device, applications are required to handle the protocol closely with the server.

Activation of the Text Mode

To enter the Text Language Acquisition mode, applications will typically provide a button on the display or a keyboard hot key that the user will press when needed. When pressed the application will send a request to the dialogue server (class DtApplicationKbdCompletionSessionReq) to ask it to engage the text completion mode. The server will reply to acknowledge.

Computation of Constraint Tree Structures

After the text mode has be activated, the dialogue manager will first build two constraint trees that will represent all the possible syntactic structures that make sense in the current dialogue context. The first tree represents all the meta-language expressions that can be used in the dialogue context and in the dialogue domain. The second tree represent all the expressions of the immediate dialogue context that can be interpreted in the application domain.

The central dialogue processor 60 builds the trees by applying constraints or "semantic masks" on the system and task grammars. The constraints are extracted from the dialogue history and the immediate dialogue context according to the dialogue model. The dialogue model indicates the structures that can be used while the long-term and short-term contexts provide the possible values. FIG. 5 shows the structures that are manipulated by the dialogue system and some examples. In FIG. 5 an example telephone answering machine application is used to illustrate the principles of the dialogue model. In the figure the number preceding each dialogue structure indicates the plausibility level that is used. A plausibility level of one means that the structure is very much likely to be used. A plausibility of five means that expressions generated by the structure are much less probable. The plausibility level is used to derive the final plausibilities for each word. Plausibilities are essential to sort candidate expressions. Expressions derived from plausibility level one typically answer the immediate context and will therefore be on the top of list shown to the user.

To set constraints on the grammars and generate incrementally the trees, the function SetConstraintSemanticCompletion is used. It has four arguments: (1) a semantic mask; (2) a pointer to the tree to update; (3) a pointer to the system grammar; and (4) a pointer to the task grammar.

Semantic masks are generative expressions based on the semantic language representation used by the server that contain eventually one or several wildcards—character $—. The wildcard is a special character that can be substituted by any string. It allows the generation of different structures with a single mask. For instance to generate all the color names contained in a grammar, the mask Color=$() can be used and will generate the structures Color=Red(), Color=Yellow(), Color=Blue(), etc.

The central dialogue processor will systematically take one after the other the top-level structures defined above and, exploring the short-term and long-term contexts, will build semantic masks that will be passed to the SetConstraintSemanticCompletion function. More specifically the central dialogue processor according to the dialogue model will search out in the immediate dialogue context and the dialogue history the parsing nodes that correspond to the command being processed, or the last command if no command is currently being parsed. It will use a parsing table attached to the nodes to get all the possible choices that are parsable within each node. A parsing table is composed of a list of semantic masks and is used to parse incoming messages. Doing so, the central dialogue processor can derive the direct answers, all the possible corrections and so forth. Dialogue meta-command masks are simply added to the list of masks. Plausibilities are attached when the search is done. The masks obtained from the list will be then used to build the dialogue and application trees. Note that the application tree describes the structures that answer the immediate dialogue context in the application domain. The dialogue tree contains the rest.

Requests for Completion Pages

Once the text completion mode is engaged, the application is allowed to ask the server what are the next possible word candidates that can be typed to complete the initial buffer. Most often the text completion mode will be started with no leading characters, in which case the application will get all the possible "first" words which start valid sentences. Because the number of words that can be obtained is variable, the request does not concern the entire list, but rather part of the list—or completion page of fixed size. Therefore several requests (class DtApplicationKbdCompletionPageReq) may be necessary to load the entire list. Note that it is the application that initiates the communication for completion pages. When receiving the request for the first completion page, the server will compute the list, given the two constraint trees and given the initial input buffer sent by the application as parameter.

Display of the List

Once all the possible completions have been acquired from the server, the application is expected to display the list so that the user can consult it. The words should be displayed by plausibility order. Note that this is possible since a plausibility score is attached to each word sent by the server. Typically the list is displayed as a pop-up window next to the keyboard input buffer.

Content of the List

The list contains the possible next words or ends of words if a word is partially typed in the input buffer. It may also contain three special words which are: (1) [Enter] to indicate that the string of characters typed represents a sentence that is complete and interpretable; (2) [Space] to indicate the separator between words; (3) [BackSpace] to go back and erase the last word typed. It is then possible to navigate within the structure, visualize the possible sentences and commands available and execute them.

Interaction

Typically after each character typed on the keyboard, a new set of completion pages will be sent to the server to acquire the new list and update the completion window. Another implementation could be to update at the word level. Note that when an illegal character is typed the list will be empty.

Validation of an Input While in Text Completion Mode

To validate an input either the carriage return key can be used or the entry [Enter] in the completion list can be selected with the mouse for example. The input string is then sent to the dialogue server the way it is sent in normal mode. The server will then start its interpretation phase and run the appropriate application scripts until an input is needed. At that point the server will check if the Text completion mode is still active. If the text completion mode is still active, the server will build the two constraint trees relative to the new dialogue context and signal the application that the dialogue context has changed. On the application side, when receiving the notification of new dialogue context, the application will also check to see if the text completion mode is active.

If it is active, the application will request the completion pages as mentioned before and finally display the list in the pop-up window.

Deactivation of the Text Completion Mode

To terminate the text completion mode the application will send a deactivation message to the server. At that point the server will not accept completion pages and it will no longer build the constraint trees. Applications will also remove the completion window from the screen.

Flowchart

Figure 6:
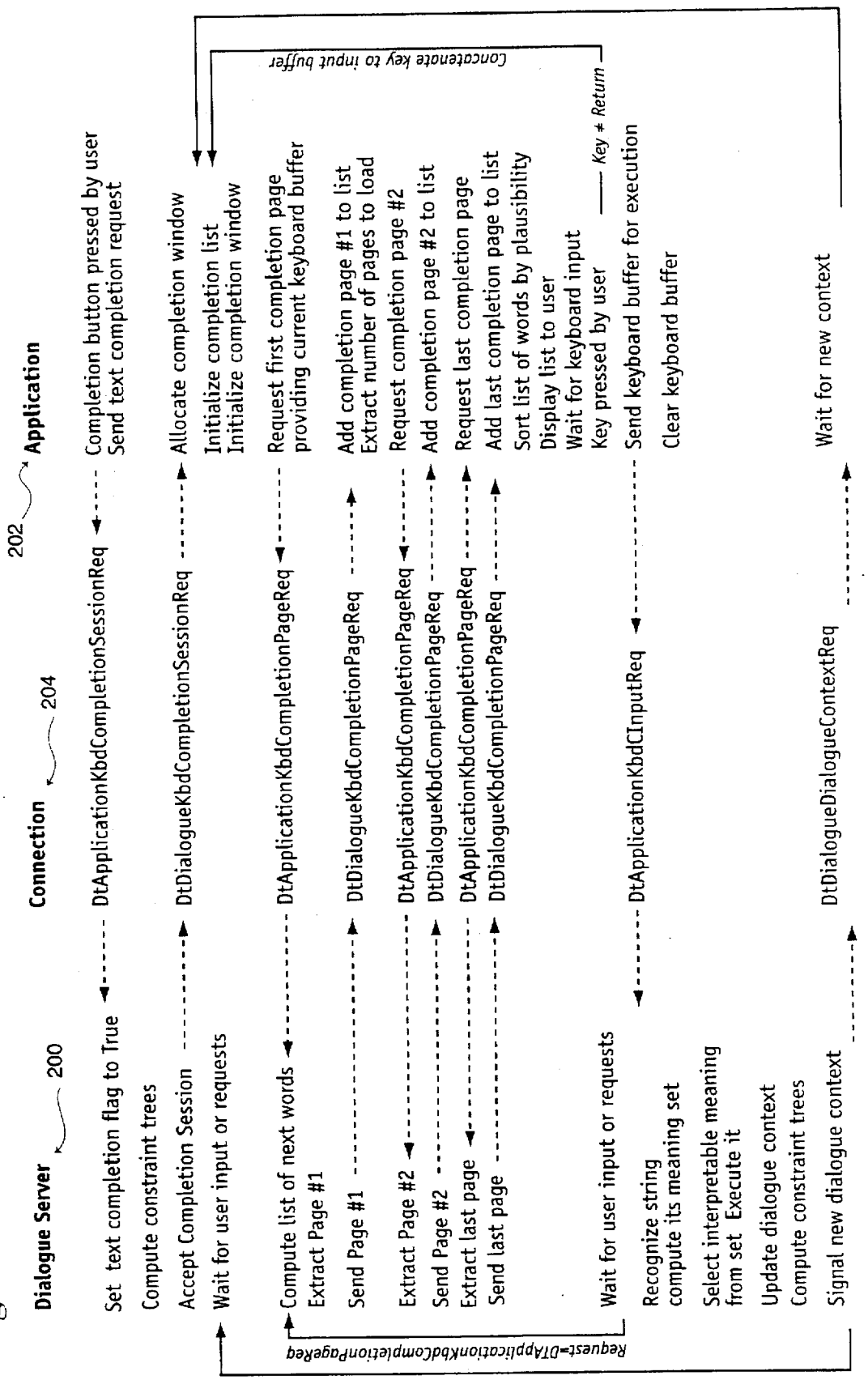
FIG. 6 is a flow diagram representing the actions which take place in text completion mode.

FIG. 6 represents graphically the operations that typically take place in the text mode. In FIG. 6 the dialogue server and application program are represented by two vertically arranged columns 200 and 202, respectively. Between those two columns is the connection column 204 which sets forth the toolkit module used to perform the given connection.

OPERATIONS PERFORMED WHILE IN SPEECH MODE

Specification of the Speech Mode

Figure 7:
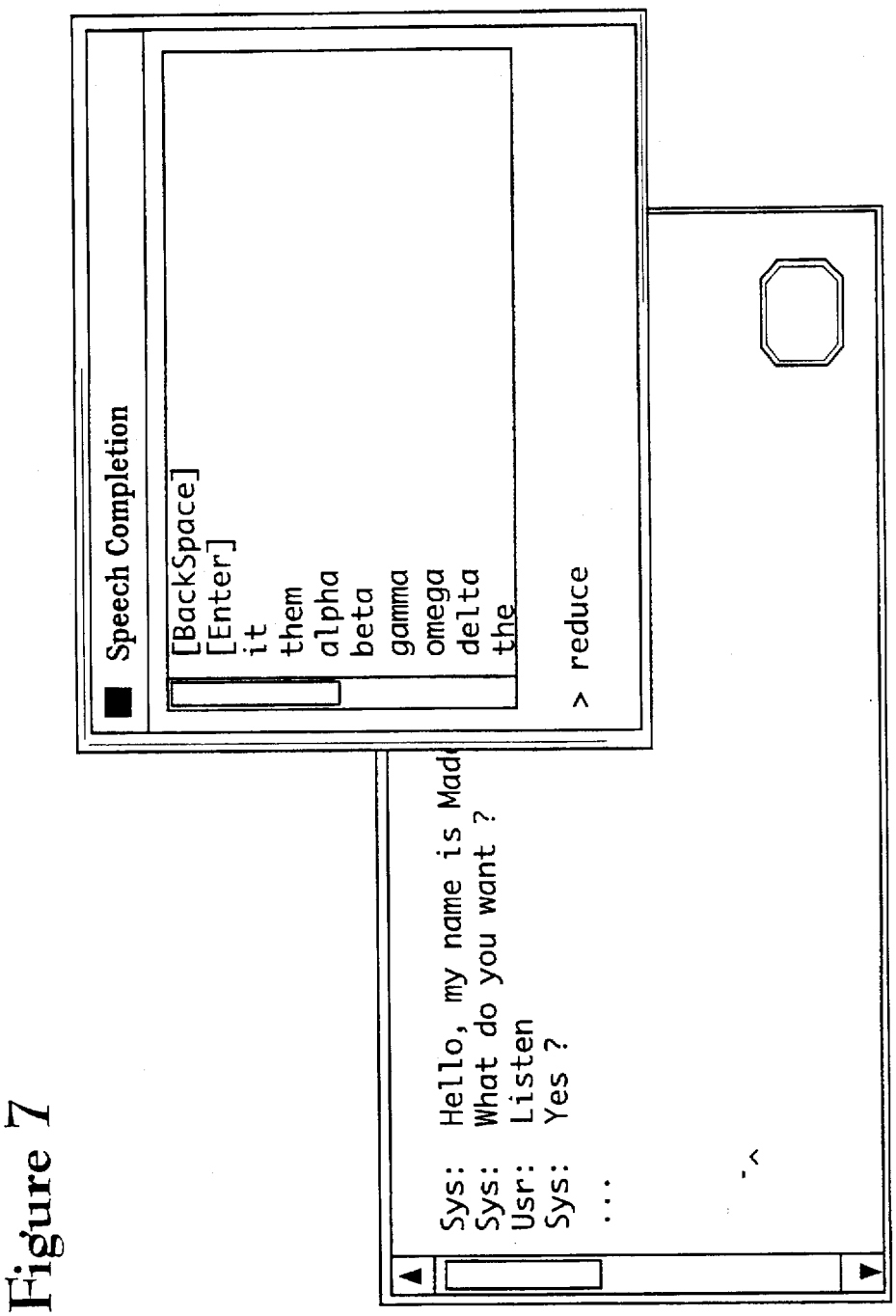
FIG. 7 is an exemplary screen showing speech completion by the invention.

The Speech Language Acquisition mode allows users to get assistance on the next possible words when they use fragmented speech input with the microphone interactively. It is then possible to build legal commands word by word. Legal commands are commands that are syntactically correct and semantically interpretable in the current context. The mechanism can be used to learn the application language or overcome possible recognition errors while speaking in standard mode. Typically users are shown a window that contains the next possible words. The entries are listed by plausibility order. The process continues until a valid command is complete. At that point it can be executed and the process restarts until the mode is deactivated. FIG. 7 shows a typical example.

Because the microphone is an application independent device, the protocol is simplified since the dialogue server internally handles the speech input buffer. Applications are only requested to display the list of words after each utterance.

Activation of the Speech Mode

To enter the Speech Language Acquisition mode, applications will also provide a button on the display or a keyboard hot key that the user will press when needed. When pressed the application will send a request to the dialogue server (class DtApplicationMicCompletionSessionReq) to ask it to engage the speech completion mode. The serve will reply to acknowledge.

Computation of Constraint Tree Structures

After the speech mode has be activated, the dialogue manager will first build two constraint trees that will represent all the possible syntactic structures that make sense in the current dialogue context. The procedure is similar to the text mode except that speech grammars are used instead of text grammars.

Requests for Completion Pages

Once the speech completion mode is engaged, the application is allowed to ask the server what are the next possible word candidates that can be uttered to complete the initial buffer. Note that when engaged the speech buffer will be empty. Because the number of words that can be obtained is variable, the request does not again concern the entire list but rather only part of the list—or completion page of fixed size. Therefore several requests (class DtApplicationMicCompletionPageReq) may be necessary to load the entire list. Note that it is the application that initiate the communication for completion pages.

Display of the List

Once all the completion have been acquired from the server, the application is expected to display the list so that the user can consult it. The words should be displayed in plausibility order. Note that this is possible since a plausibility score is attached to each word sent by the server. Typically the list is displayed as a pop-up window next to the keyboard input buffer.

Content of the List

The list contains the possible next words or ends of words if a word has been already partially typed in the input buffer. It may also contain two special words which are: (1) [Enter] to indicate that the string of character that has been typed represents a sentence that is complete and interpretable; (2) [BackSpace] to go back and erase the last word typed. It is then possible to navigate within the structure by voice, visualize the possible sentences and commands available and execute them.

Interaction

In speech mode users may pronounce single words or sequences of words. Typically after each fragment pronounced by the user, the server will automatically send the first completion page to signal the application that a new list should be displayed. At that point the application will request the remaining pages from the server. When recognition errors occur or illegal words are uttered, no progression is made in the structure and a warning message is sent to the user.

Validation of an Input While in Speech Completion Mode

To validate an input either the word "Enter" can be said or the entry [Enter] in the completion list can be selected with the mouse. The input buffer maintained by the Input processor is then tested against the speech grammars to derive its semantic meaning. The server will then start its interpretation phase and run the appropriate application scripts until new will be requested from the user. At that point the server will check if the speech completion mode is still active. If it is still active the server will build the two constraint trees relative to the new dialogue context and signal the application that the dialogue context has changed. On the application side, when receiving the notification of new dialogue context, the application will clear the currently displayed list and be prepared to receive the first completion page from the server relative to the new expressions that can be said in the new context.

Deactivation of the Speech Completion Mode

To terminate the speech completion mode applications will send a deactivation message to the server. At that point the server will not sent the initial completion page. On the application side applications will remove the completion window.

Flowchart

Figure 8:
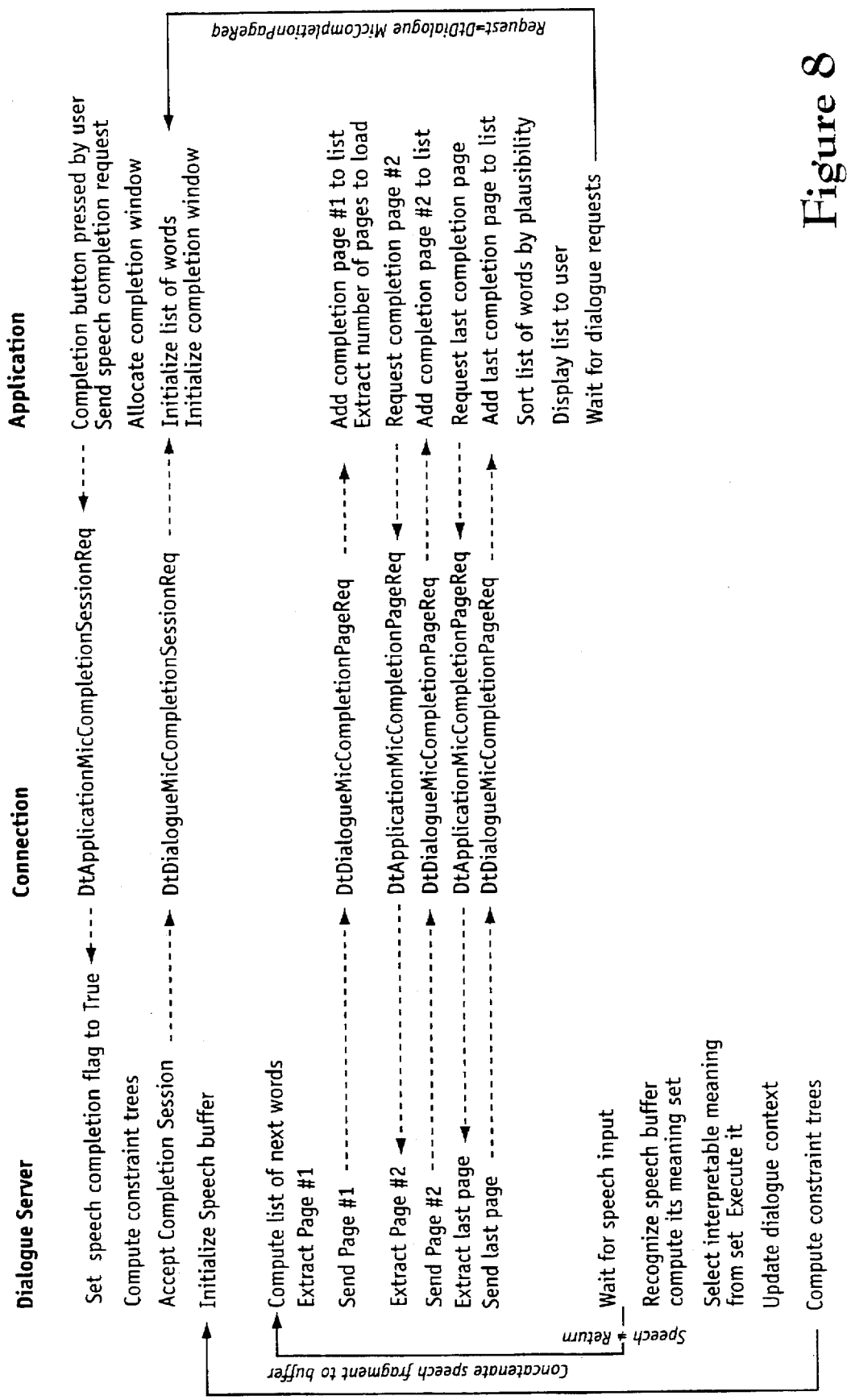
FIG. 8 is a flow diagram representing the actions which take place in speech completion mode.

FIG. 8 represents graphically the operations that typically take place in the speech mode. FIG. 8 is arranged in vertical columns, similar to that of FIG. 6.

Motivation for a Real-Time Processing

In order to be efficient, usable and therefore accepted by users, a real-time interaction between the server and the application is a key factor. This is the reason why constraint trees are built after each new dialogue context. These trees are intermediate data structures that the multitude of completion requests that follow work upon. By building these trees as intermediate data structures, no slow down can be perceived by the user.

FIGS. 9 and 10 illustrate how constraints are added to the constraint tree and how the completion list is obtained from the constraint tree. More specifically, FIG. 9 presents an example of a syntactic-semantic grammar for a very simple language. As illustrated, the syntactic-semantic grammar comprises a set of rules, which in the example have been designated with rule numbers #0–#14. The rules are used to define different attributes and they may therefore be grouped accordingly. For example, group 150 comprising rules #0–#3 define the attribute Color. The default field is used when a group could not be recognized because of recognition errors or omissions. The default field indicates the default semantic to be used. In the case of the Color group its value is 'Color=?()'. The ? marker indicates that the color name could not be recognized. The dialogue manager will most certainly ask specific questions on the unspecified value later on in the dialogue. Similarly, group 152 defines the attribute Name. Group 154 defines the attribute Item; group 156 defines the attribute NounPhrase. Note that the rules which define NounPhrase define phrases which in turn use other attributes, such as the attributes Color, Item and Name. Finally, group 158 defines the attribute TopLevel. The TopLevel attribute has three rules, #12 and #13, rule #14 representing what can be said.

Each of the rules comprising the grammar includes a description of the syntax, shown in the region designated 160 and a corresponding semantic expression shown in the region designated 162. The syntactic information of region 160 shows how each of the defined members of a given attribute are spelled. In the case of a NounPhrase, the "spelling" includes the proper whitespace locations as well as the order of attributes which define the phrase. The semantic expressions of region 162, corresponding to each of the syntactic expressions of region 160, are expressed using a nomenclature which is independent of language. The grammar defined in this way represents a static knowledge of all possible expressions to which the target application can respond.

Figure 11:
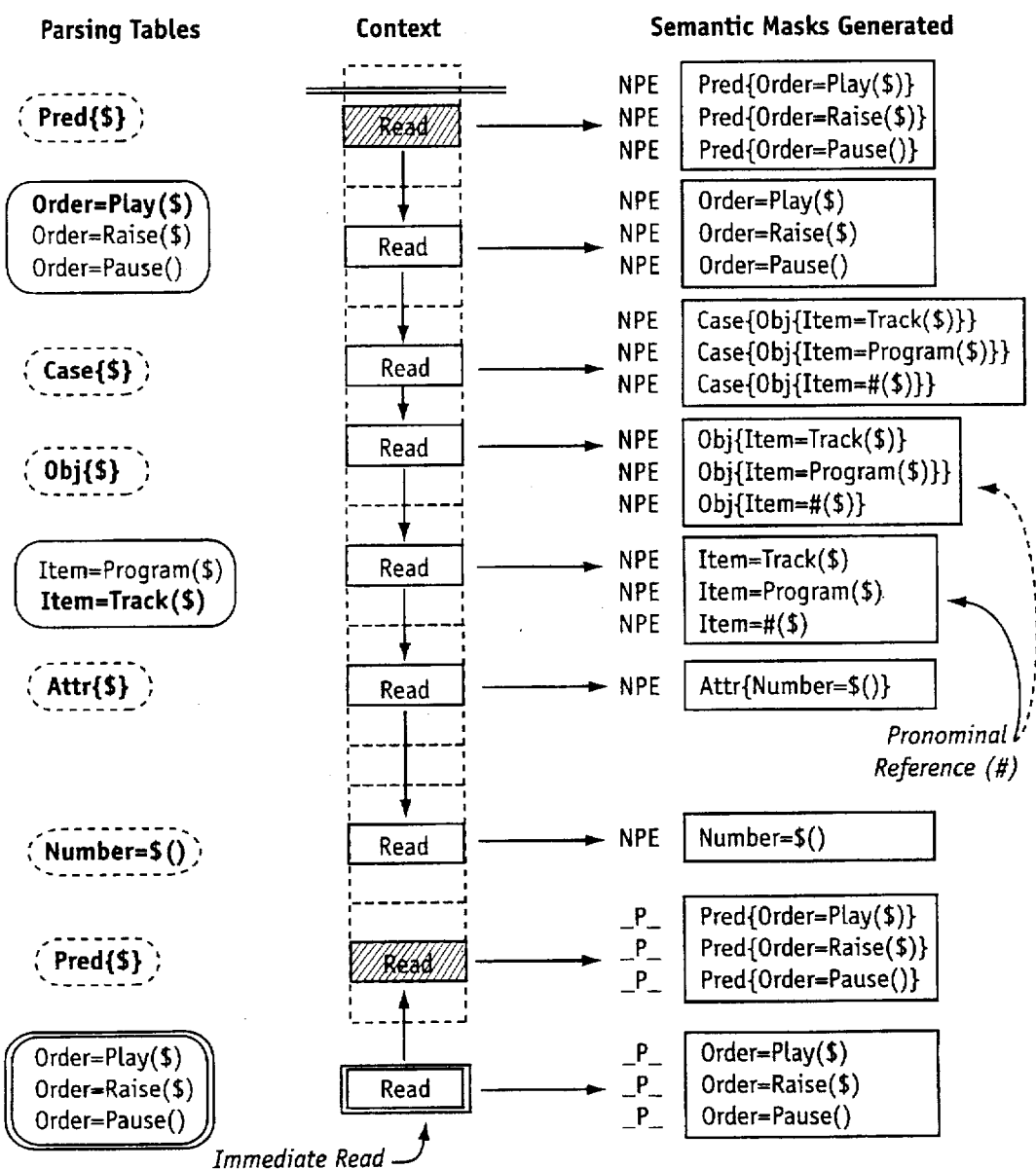
FIG. 11 illustrates how the semantic masks are built from the dialogue context.

FIG. 10 illustrates how a constraint tree is built using the grammar of FIG. 9 for the semantic expression "Item=$ (Attributes[Color=$()])." In building the tree semantic masks are built from the dialogue context. One example of a semantic mask is illustrated in FIG. 11. Semantic masks are partially contained in the parsing table and also built from the dialogue history, as shown in FIG. 11 for the specific example. This semantic expression represents a mask which can match several syntactic expressions of the grammar (e.g. the red cube, the black sphere, etc.). The presently preferred implementation utilizes the semantic expression mask by following the procedure illustrated in FIG. 10.

Building the Constraint Trees

Constraint trees are built to serve as intermediate structures that will speed up the process and the interaction while in text or speech completion mode. They describe all the possible inputs the user can make that make sense in the current context. The trees reflect syntactic constraints on the grammars that restrict the possible sentences that can be generated. To restrict or constrain the generation, semantic masks are applied on the grammars. The function SetConstraintSemanticCompletion provided is used to incrementally generate the constraint trees. The masks are computed by the central dialogue processor based on the immediate dialogue context and the dialogue history according to the dialogue model.

Dialogue Model

The Dialogue model describes the expressions that can be understood by the dialogue manager in terms of structure. See FIG. 5. If the dialogue model describes the logical form that can be used, the dialogue context stored in the dialogue manager provides the values, which are for most of them application dependent. Given a context the generated masks will represent: (1) all the possible direct answers, (2) all the over-informative answers, (3) all the elliptical answers, (4) all the corrective answers, and (5) all the built-in dialogue meta-commands.

The immediate dialogue context is used to derive form expressions of plausibility level 1 (form #1). The dialogue history is used to derive forms of probability levels 2–4 (forms #2–4). Built-in dialogue meta-commands (level 5 or form #5) are application independent. To summarize the dialogue model is a tool that allows the dialogue server to predict the user's inputs.

Application dependent information is provided via scripts and more precisely in the parsing nodes—or Read instructions. They are used to parse inputs from the user. Each node will describe all the parsing alternatives—given in a parsing table—that are allowed and each possible path will point to a sub-parsing node or just end. By examining the possible alternatives the user could have used, the dialogue manager is able to construct all the masks of forms #2, #3 and #4. Typically many masks will be generated, since corrective input can operate on any piece of information given in the last command, for instance.

Form #1 inputs are simply derived from the current parsing table and form #5 inputs are fixed and for most of them, always available (e.g. cancel, repeat and help).

FIG. 11 gives more detailed information on the computation of forms #1, #2, #3 and #4. In FIG. 11, possible answers include: "Pause," "Raise the volume," "no 6," "no track 6," "no play track 6," and "no raise the volume."

Incremental construction of trees and requests made on trees

The masks that are generated are applied on the grammars with the function SetConstraintSemanticCompletion. FIG. 10 shows the process.

The trees are constructed only once, after each new dialogue context, but are used several times to build the different lists of next possible words in the text and speech completion modes. At that point the completion algorithm will use the grammars and the constraint trees to generate the lists of words given the leading strings. This final computation is not computationally expensive and allows a real-time interaction between the dialogue server and the application in charge of displaying the lists to the user.

Summary

From the foregoing it will be seen that the present invention provides a highly useful multimodal dialogue environment and user interface to assist a user in acquiring the language of an application or computer program using text and speech input. The system allows users unfamiliar with the language or available commands of an application or computer program to progressively build sentences which will having meaning to the application or computer program.

Although the invention has been described in connection with a general purpose computer application, it will be understood that invention does not depend on the nature of the application program. As such, the application program could be embedded in an electronic device, such as a VCR, telephone, multimedia system or other consumer electronic product.

While the invention has been described in connection with the presently preferred embodiment, it will be understood that the invention is capable of modification without departing from the spirit of the invention as set forth in the appended claims.

APPENDIX

The DTDialogueKbdCompletionSessionReq Request

The *DtDialogueKbdCompletionSessionReq* request is a request by which the server notifies the application whether the text completion is turned On or Off. Note that it is the dialogue server that turns the completion One and Off after a request form the user. To set the text completion mode On or Off, applications send a *DtApplicationKbdCompletionSessionReq* Request to the server. Applications are encouraged to signal the completion state.

```
typedef struct
{
    int Class;
    Boolean State;
} DtDialogueKeyboardCompletionSessionRequest
``` where:

Boolean State: Boolean indicating whether the completion will be turned On or Off.

To reply to a *DtDialogueKbdCompletionSessionReq* request applications must send a *DtApplicationKbdCompletionSessionAns* class message to the server for acknowledgment.

```
typedef struct
{
    int Class;
} DtApplicationKeyboardCompletionSessionAnswer;
```

The DtDialogueMicCompletionSessionReq Request

The *DtDialogueMicCompletionSessionReq* request is a request by which the server notifies the application whether the speech completion is turned On or Off. Note that it is the dialogue server that turns the completion On and Off after a request from the user. To set the speech completion mode On or Off, applications send a *DtApplicationMicCompletionSessionReq* Request to the server. Applications are encouraged to signal the completion state.

```
typedef struct
{
    int Class;
    Boolean State;
} DtDialogueMicrophoneCompletionSessionRequest
``` where:

Boolean State: Boolean indicating whether the speech completion will be turned On or Off.

To reply to a *DtdialogueMicCompletionSessionReq* request applications *DtApplicationMicCompletionSessionAns* class message to the server for acknowledgment.

```
typedef struct
{
    int Class:
} DtApplicationMicrophoneCompletionSessionAnswer;
```

The DtCompletionPage Structure

The *DtCompletionPage* structure is used to transfer completion pages to applications that made a request for keyboard completion (see *DtApplicationCompletionRequestReq* request). Each page contains the possible words (or end of words) that complete the current keyboard buffer. The maximum number of line for each page is limited to *DtCompletionPageSize*. If the completion is larger than *DtCompletionPageSize* elements, more than one page will be sent. (See *DtDialogueCompletionPageReq* request). Typically, applications are expected to display a pop-up window showing the possible words.

The DtGetCompletionPageDescription Function

This function allows application to get global information about the page.

Synopsis:

void DtGetCompletionPageDescription(CplPage,TotalPage, TotalCount,Page,Count) where:

DtCompletionPage *CplPage: pointer to the structure to access, int *TotalPage: integer indicating the total number of pages for the current completion request from the application, int *TotalCount: integer representing the total number of entries for the current completion request, int *Page: index of the current page, int *Count: number of entries in the page Note that the server will send the pages in ascending order. The last page to be received will have a Page number equal to TotalPage.

The DtGetItemCompletionPage Function

This function allows applications to get the information relative to a page entry.

Synopsis:

void DtGetItemCompletionPage(CplPage,Ptr,Text) where:

* DtCompletionPage *CplPage: Pointer to the structure to access,

* int Ptr: Index of the entry to access in the page,

* String *Text: Text representing one possible next word (or end of word).

Note that two special string are being used:

* <Space> to indicate a space character,

<Return> to indicate that the current buffer is a valid command ready to be sent.

It is important to note that the applicationmessage DtDialogueDialogueContextReq after each change in the dialogue context. This can be used to ask for new pages when the completion mode is on. Example:

```
if (DlgMsg.Class==DtDialogueDialogueContextReq)
{
    if(GetdialogueCompletionState())-
        requestCompletionPage();
    ApplMsg.Class=DtApplicationDialogueContextAns;
    DtPutDialogueAnswer((*Appl).DlgCnx,&ApplMsg);
```

The DtDialogueKbdCompletionPageReq Request

The *DtDialogueKbdCompletionPageReq* request is a request by which the server notifies theplication that a completion page is ready for display. When typing on the keyboard, completion requests (see *DtApplicationKbdCompletionPageReq* request) might be sent to the server and examining the dialogue context the server will send back a list of pages (i.e. a list of *DtDialogueKbdCompletionPageReq* requests) containing the next valid words. A *DtCompletionPage* structure is used to represent the page. This is an opaque structure that has been presented earlier. Note that the complete completion list is obtained after all the pages have been received. The completion mechanism is contextual and helps users learn the command language used to interact with applications.

```
typedef struct
{
    int Class;
    DtCompletionPage Page;
} DtDialogueKeyboardCompletionPageRequest
``` where:

DtCompletionPage Page: Page to be displayed that is part of the completion list.

To reply to a *DtDialogueKbdCompletionPageReq* request applications must send a *DtApplicationKbdCompletionPageAns* class message to the server for acknowledgment.

```
typedef struct
{
    int Class;
} DtApplicationKeyboardCompletionPageAnswer
```

The DtDialogueMicCompletionPageReq

The *DtDialogueMicCompletionPageReq* request is a request by which the server notifies the application that a completion page is ready for display. When giving input voice commands, completion requests (see *DtApplicationMicCompletionPageReq* request) might be sent to the server and examining the dialogue context the server will send back a list of pages (i.e. a list of *DtDialogueMicCompletionPageReq* requests) containing the next valid words. A *DtCompletionPage* structure is used to represent the page. Note that the complete completion list is obtained after all the pages have been received. The completion mechanism is contextual and helps users learn the command language used to interact with applications. For the microphone completion mode, the application is notified by the server of a change in the dialogue context by a *DtDialogueDialogueContextReq*. When this request is received the application should check if the microphone completion mode is on, and if so, request completion pages.

Due to the properties inherent to speech, the speech completion mode has different features as compared to the text completion mode. In particular, in the speech completion mode the user can give several words at a time or the complete sentence, if he wants. In other words, the speech completion mode use fragments instead of words. Furthermore, in the text completion mode the completion buffer is handled by the application but in the speech completion mode it is handled by the server.

```
typedef struct
{
    int Class;
    DtCompletionPage Page;
} DtDialogueMicrophoneCompletionPageRequest
``` where:

DtCompletionPage *Page*: Page to be displayed that is part of the completion list.

To reply to a *DtDialogueMicCompletionPageReq* request applications must send a *DtApplicationMicCompletionPageAns* class message to the server for acknowledgment.

```
typedef struct
{
    int Class;
} DtDialogueMicrophoneCompletionPageAnswer
```

The DtApplicationKbdCompletionPageReq Request

The *DtApplicationKbdCompletionPageReq* request is a request for a text completion. Regarding the text completion, when typing on the keyboard, applications might send a completion request corresponding to the current keyboard buffer. Because the list of choices can be very large, the completion mechanism is based on the notion of completion pages and the *DtApplicationKbdCompletionPageReq* request is more precisely a request for a completion page. Each page contains the possible words (or end of words) completing the initial string. Then for each request, the server will send back a completion page (see *DtDialogueKbdCompletionPageReq* request). Given a dialogue context, the first request should concern the page number 1. Information on the total size of the list is provided on each page returned by the server.

```
typedef struct
{
    int Class;
    int Page;
    DtDialogueString Text;
} DtApplicationKeyboardCompletionPageRequest;
``` where:

* int Page: Page number to load,

* DtDialogueString Text: String to complete.

To reply to a *DtApplicationKbdCompletionPageReq* request the server will compute the completion (if needed), extract the desired page and send a *DtDialogueKbdCompletionPageAns* class message to the application.

```
typedef struct
{
    int Class;
} DtDialogueKeyboardCompletionPageAnswer
```

Follows an example of function which send a *DtApplicationKbdCompletionPageReq* to the server. Example:

```
void SendDialogueKeyboardCompletionPageRequest(Buffer,Page)
String Buffer;
int Page;
{
    DtApplicationMessage ApplMsg;
    DtDialogueMessage DlgMsg;
    ApplMsg.Class=DtApplicationKbdCompletionPageReq;
    strcpy(ApplMsg.KeyboardCompletionPageRequest.Text.-
    Value,Buffer);
    ApplMsg.KeyboardCompletionPageRequest.Page=page;
    DtPutDialogueRequest((*Appl).DlgCnx,&ApplMsg);
    DtGetDialogueAnswer((*Appl).DlgCnx,&DlgMsg);
}
```

The DtApplicationMicCompletionPageReq Request

The *DtApplicationMicCompletionPageReq* request is a request for a speech completion. Regarding the speech completion, if the speech completion mode is on, applications might send a completion request after each change of the dialogue context. For each request, the server will send back a completion page (see *DtDialogueMicCompletionPageReq* request). Given a dialogue context, the first request should concern the page number 1. Information on the total size of the list is provided on each page returned by the server.

```
typedef struct
{
    int Class;
    int Page;
    DtDialogueString Text;
} DtApplicationMicrophoneCompletionPageRequest;
``` where:

* int Page: Page number to load,

* DtDialogueString Text: String to complete.

To reply to a *DtApplicationMicCompletionPageReq* request the server will compute the completion (if needed), extract the desired page and send a *DtDialogueMicCompletionPageAns* class message to the application.

```
typedef struct
    int Class;
} DtDialogueMicrophoneCompletionPageAnswer
```

The DtApplicationKbdCompletionSessionReq Request

The *DtApplicationKbdCompletionSessionReq* is a request from the application to ask the server to set the text completion mode On or Off.

```
typedef struct
{
    int Class;
    Boolean State;
} DtApplicationKeyboardCompletionSessionRequest
``` where:

Boolean State: Boolean indicating whether the text completion mode should be turned on or off.

To reply to a *DtApplicationKbdCompletionSessionReq* request the server sends a *DtDialogueKbdCompletionSessionAns* class message to the application.

```
typedef struct
{
    int Class:
} DtDialogueKeyboardCompletionSessionAnswer;
```

Follows an example of function which sends a *DtApplicationKbdCompletionSessionReq* to the server. Example:

```
void RequestStateDialogueKeyboardCompletionSession(State)
Boolean State;
{
    DtApplicationMessage ApplMsg;
    DtDialogueMessage DlgMsg;
    ApplMsg.Class=DtApplicationKbdCompletionSessionReq;
    ApplMsg.KeyboardCompletionSessionRequest.State=State;
    DtPutDialogueRequest((*Appl).DlgCnx,&DlgMsg);
    DGetDialogueAnswer((*Appl).DlgCnx,&DlgMsg);
}
```

The DtApplicationMiccompletionsessionReq Request

The *DtApplicationMicCompletionSessionReq* is a request from the application to ask the server to set the speech completion mode On or Off.

```
typedef struct
{
    int Class;
    Boolean State;
} DtApplicationMicrophoneCompletionSessionRequest;
``` where:

Boolean State: Boolean indicating of the speech completion mode should be turned on or off.

To reply to a *DtApplicationMicCompletionSessionReq* request the server sends a *DtDialogueMicCompletionSessionAns* class message to the application.

```
typedef struct
{
    int Class;
} DtDialogueMicrophoneCompletionSessionAnswer;
```

What is claimed is:

1. A supervised contextual restricted natural language acquisition system for computerized applications, comprising:

first means for defining and storing a dialogue history context;

second means for defining and storing a dialogue model;

third means for defining and storing at least one syntactic-semantic grammar;

fourth means responsive to said first, second and third means for building a language to individually represent both dialogue-specific expressions and application specific application expressions and means to represent said application-specific expressions as at least one prediction tree representing at least one possible dialogue that is semantically consistent with the stored dialogue history context and stored dialogue model and fifth means to interpret said dialogue-specific expressions to supply instructions to the language acquisition system; and user interface means for providing language assistance to the user based on said prediction tree.

2. The system of claim 1 wherein said third means includes means for defining and storing at least one application-specific grammar and at least one system-specific grammar.

3. The system of claim 1 wherein said second means includes means for defining and storing a dialogue model which defines the type of interaction in terms of dialogue answers.

4. The system of claim 1 wherein said third means includes a database of grammar rules arranged as uniquely labeled rules.

5. The system of claim 1 in which the restricted natural language is used to communicate with a target application and wherein said third means includes a database of scripts comprising possible dialogue scenarios supported by said a target application.

6. The system of claim 1 in which the restricted natural language is used to communicate with a target application and further comprising means for establishing a communication channel between a user and said target application.

7. The system of claim 6 wherein said first means includes a mechanism for monitoring the communication channel and for making a record of the context state of the target application during interaction with the application by the user.

8. The system of claim 6 wherein said fourth means has mechanism for monitoring the communication channel and for rebuilding at least one prediction tree automatically as a user interacts with the target application over said communication channel.

9. The system of claim 6 further comprising multi-modal communication support mechanism coupled to said communication channel whereby the user may communicate with the application using at least voice and manual input modes.

10. The system of claim 1 wherein said first means includes a mechanism for recording the context state of the language acquisition system as a user interacts with it through said user interface.

11. The system of claim 1 wherein said user interface includes multi-modal input mechanism whereby the user may communicate with the language acquisition system using at least voice and manual input modes.

12. An interactive restricted natural language acquisition system for a computerized application comprising:
- an application manager coupled to said computerized application for providing an interface to said computerized application;
- at least one dialogue database containing syntactic and semantic information regarding a language;
- an input/output manager having at least one generator for generating messages using said dialogue database and having at least one recognizer for processing user input using said dialogue database and for extracting semantic information from said user input;
- a dialogue manager coupled to said application manager and to said input/output manager for interpreting said semantic information and for selectively issuing commands through said application manager to the computerized application in response to said semantic information;
- said dialogue manager including means for selectively building first and second tree structures based on current and historical user interaction said tree structures representing dialogue-specific and application-specific information respectively whereby the user is provided with language acquisition assistance on an interactive basis.

13. The system of claim 12 wherein said system includes user actuable means for invoking the building of said tree structure, whereby language acquisition assistance is activated at the user's initiative.

14. The system of claim 12 wherein said dialogue manager includes context handler for maintaining a first record of a short-term context and a second record of a long-term context, said context handler automatically updating said first and second records in response to interaction by the user.

15. The system of claim 12 wherein said input/output manager comprises a multimodal interface supporting at least text and speech input.

16. The system of claim 12 wherein said input/output manager comprises a multimodal interface supporting at least text and speech output.

17. The system of claim 12 wherein said dialogue manager includes a dialogue processor for defining a dialogue model which supports both meta-commands and application commands used for the interaction.

18. The system of claim 12 wherein said application manager comprises a toolkit of communications functions for enabling the exchange of information between said computerized application and said dialogue server.

19. The system of claim 12 wherein said dialogue manager includes means for selectively building an ordered list arranged in order of a predetermined plausibility.

20. The system of claim 12 wherein said application manager communicates with said dialogue manager through application scripts that describe the application scenario at the dialogue level.

21. The system of claim 12 wherein said dialogue manager has a speech mode for handling speech input consisting of words and sequences of words.

22. The system of claim 12 wherein said dialogue manager has a text mode for handling text input consisting of characters, words and sequences of words.

23. The system of claim 12 wherein said input/output manager comprises a multimodal interface supporting mouse input.

24. The system of claim 12 wherein said input/output manager comprises a multimodal interface supporting touch screen input.

25. A language acquisition system to assist a user in a dialogue with a computer-implemented application program, comprising:
- input system for supporting at least one of text and speech modes of input;
- a first means for storing a dialogue context;
- a second means for defining a dialogue model which describes the structure of a dialogue;
- a third means for defining at least one syntactic-semantic grammar;
- fourth means coupled to said first, second and third means to interactively assist the user in building commands which to the application program are syntactically and semantically correct and which can be interpreted by the dialogue manager in the current context;
- said fourth means for generating assistance differently based on the mode of input supplied to said input system.

26. The system of claim 25 wherein the fourth means generates assistance selectively at a character-by-character, word-by-word or phrase-by-phrase basis depending on the mode of input.

27. The language acquisition system of claim 25 wherein said third means defines a restricted natural language grammar.

28. The language acquisition system of claim 25 further comprising means for supplying actions resulting from said commands to said application program.

29. The language acquisition system of claim 28 further comprising user selectable means for selectively building said commands and controlling whether said commands will be executed by said application program or not.

30. The language acquisition system of claim 25 wherein said first, second and third means are interactively coupled together to build said commands progressively.

31. The language acquisition system of claim 30 wherein said commands are built progressively in accordance with at least one syntactic-semantic grammar such that user errors in syntax are automatically detected.

32. The language acquisition system of claim 30 wherein said commands are built progressively in accordance with at least one syntactic-semantic grammar such that user errors in semantics are automatically detected.

33. The language acquisition system of claim 25 wherein a semantic representation defined in the syntactic-semantic grammar renders said language acquisition system independent of the application program language.

34. The language acquisition system of claim 25 wherein said third means is constructed to receive data describing at least one syntactic-semantic grammar and for establishing a set of rules based on said data for building said commands, whereby the language acquisition system can be adapted to work with a plurality of different languages.

35. The language acquisition system of claim 25 wherein said third means is constructed to receive data describing at least one syntactic-semantic grammar and for establishing a set of rules based on said data for building said commands, whereby the language acquisition system can be adapted to work with a plurality modes of communication, including text and speech.

36. The language acquisition system of claim 25 wherein said first, second and third means are configured to define a first mechanism which is independent of any application program and to define a second mechanism which is dependent on a particular application program.

37. The language acquisition system of claim 25 wherein said dialogue model supports a plurality of different types of dialogues including (a) negation of a prior dialogue;

(b) direct answer; and (c) reference to a prior dialogue.

* * * * *